(12) United States Patent
Saund et al.

(10) Patent No.: US 6,903,751 B2
(45) Date of Patent: Jun. 7, 2005

(54) SYSTEM AND METHOD FOR EDITING ELECTRONIC IMAGES

(75) Inventors: Eric Saund, San Carlos, CA (US); Thomas P. Moran, Palo Alto, CA (US); Daniel L. Larner, San Jose, CA (US); James V. Mahoney, Palo Alto, CA (US); David J. Fleet, Menlo Park, CA (US); Ashok C. Popat, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 237 days.

(21) Appl. No.: 10/104,805

(22) Filed: Mar. 22, 2002

(65) Prior Publication Data

US 2003/0179214 A1 Sep. 25, 2003

(51) Int. Cl.[7] ................................................. G09G 5/00
(52) U.S. Cl. ....................................................... 345/619
(58) Field of Search ................................ 345/614, 625, 345/442, 650, 619

(56) References Cited

U.S. PATENT DOCUMENTS

| | | | | |
|---|---|---|---|---|
| 5,506,946 A | * | 4/1996 | Bar et al. ..................... | 345/600 |
| 5,548,700 A | | 8/1996 | Bagley et al. ............... | 395/144 |
| 5,553,224 A | * | 9/1996 | Saund et al. ................ | 345/619 |
| 5,664,180 A | * | 9/1997 | Halpert et al. .............. | 707/102 |
| 5,687,306 A | * | 11/1997 | Blank ......................... | 345/634 |
| 5,861,886 A | * | 1/1999 | Moran et al. ............... | 345/863 |
| 5,889,523 A | | 3/1999 | Wilcox et al. .............. | 345/357 |
| 5,912,668 A | | 6/1999 | Sciammarella et al. ..... | 345/348 |
| 5,926,186 A | | 7/1999 | Itoh et al. .................... | 345/433 |
| 5,974,198 A | | 10/1999 | Hamburg et al. ........... | 382/284 |
| 6,020,895 A | | 2/2000 | Azami ......................... | 345/433 |
| 6,028,583 A | | 2/2000 | Hamburg ..................... | 345/112 |
| 6,184,860 B1 | | 2/2001 | Yamakawa .................. | 345/146 |
| 6,459,442 B1 | * | 10/2002 | Edwards et al. ............ | 345/863 |
| 6,651,221 B1 | * | 11/2003 | Thompson et al. ......... | 715/541 |
| 2002/0081040 A1 | * | 6/2002 | Uchida ........................ | 382/311 |
| 2002/0175948 A1 | * | 11/2002 | Nielsen et al. .............. | 345/781 |
| 2003/0002733 A1 | * | 1/2003 | Tsai et al. .................... | 362/165 |
| 2003/0051255 A1 | * | 3/2003 | Bulman et al. ............. | 725/135 |
| 2003/0086127 A1 | * | 5/2003 | Ito et al. ..................... | 358/462 |

FOREIGN PATENT DOCUMENTS

| | | |
|---|---|---|
| EP | 0 637 812 A2 | 2/1995 |
| EP | 0 816 999 A2 | 1/1998 |

* cited by examiner

*Primary Examiner*—Michael Razavi
*Assistant Examiner*—Hwa C. Lee
(74) *Attorney, Agent, or Firm*—Linda M. Robb

(57) ABSTRACT

A graphical input and display system for creating and manipulating electronic images includes input devices permitting a user to manipulate elements of electronic images received from various image input sources. A processor, connected to the system, receives requests for various image editing operations and also accesses a memory structure. The system memory structure includes a user interaction module, which allows a user to enter new image material or select and modify existing image material to form primary image objects, as well as a grouping module, which maintains an unrestricted grouping structure, an output module, and data memory.

37 Claims, 22 Drawing Sheets

SYSTEM AND METHOD FOR EDITING ELECTRONIC IMAGES

CROSS REFERENCE TO RELATED APPLICATIONS

The following copending applications, U.S. application Ser. No. 10/104,523, filed Mar. 22, 2002, titled "Method and System for Interpreting Imprecise Object Selection Paths", U.S. application Ser. No. 10/104,804, filed Mar. 22, 2002, titled "Method and System for Overloading Loop Selection Commands in a System for Selecting and Arranging Visible Material in Document Images", and U.S. application Ser. No. 10/104,396, filed Mar. 22, 2002, titled "Method for Gestural Interpretation in a System for Selecting and Arranging Visible Material in Document Images", are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 5,548,700 to Bagley et al. ("Editing Text in an Image"); U.S. Pat. No. 5,553,224 to Saund et al. ("Method for Dynamically Maintaining Multiple Structural Interpretations in Graphics System"); U.S. Pat. No. 5,889,523 to Wilcox et al. ("Method and Apparatus for Dynamically Grouping a Plurality of Graphic Objects"); U.S. Pat. No. 5,974,198 to Hamburg et al. ("Adjustment Layers for Composited Image Manipulation"); U.S. Pat. No. 6,028,583 to Hamburg ("Compound Layers for Composited Image Manipulation"); U.S. patent application Ser. No. 09/199,699 ("Method and Apparatus for Separating Document Image Object Types" to Saund); and U.S. patent application Ser. No. 09/158,443 (System and Method for Color Normalization of Board Images" to Saund et al.).

BACKGROUND OF THE INVENTION

This invention relates generally to graphical image manipulation systems, and more particularly to a method for creating and editing electronic images of documents.

Two major classes of image editors are structured graphics, or vector-based editors, and digital paint, or raster-based editors. Structured graphics editors are suitable for editing graphic objects such as lines, curves, polygons, etc. Other types of images such as photographs, are more suitably edited in "paint" style editors that preserve the full variation and tone of the markings in terms of a two-dimensional raster of pixel intensities. Paint style image editing programs support the import and editing of raster-format electronic images. Various means are provided for selecting image regions for further manipulation such as deleting, copying, moving, rotating, and scaling. These programs are designed for editing of general photographic images, and they are limited in the degree of support they provide for the more specialized features and requirements of editing raster images of documents.

Paint style programs maintain an electronic canvas of pixel intensities. In some programs, the user is presented with a very simple usage model, which is easy to understand but offers limited functionality. In simple paint programs there is only one canvas layer. The process of selecting and moving image material causes the pixel values in one image region to replace the pixel values in a corresponding region at a different, destination location. Once such a procedure is completed, there is no notion of an image object as such that can be re-selected, to replicate the previous selection operation. This shortcoming is particularly problematic when some pixel values are treated as transparent: in this case pixels with these values do not replace pixel values in the destination location, and then two image objects can become intermingled and effectively inseparable.

Other, more complex paint-style programs, offer greater functionality but are much more difficult for users to understand and operate. In these programs multiple canvases represent different layers, where the topmost visible layer determines what is actually rendered as the visible image. Layers are dealt with explicitly by the user through complex sets of keyboard and mouse commands and auxiliary windows. Users can cause new empty layers to be created, and they can perform operations which cause regions of any source layer to be removed and copied to a different destination layer. The user maintains control over the ordering of layers. When a user wishes to move or modify an object, they must find the corresponding layer, then shift that layer's positioning over the base canvas. If the user wishes to move or modify several objects at once, then a lengthy series of steps must be undertaken to get all of the objects onto a single layer or group of layers treating the objects as a unified collection.

In both simple and complex paint programs, certain pixel color/intensities can be defined to be transparent so that pixels from layers beneath them are made visible, as is illustrated in FIG. 1. As shown in FIG. 1, when a user performs a selection gesture 110 to select a visible image object to move, the selection gesture includes not only the visible markings 120, but also surrounding background pixels 130. If the background is not rendered transparent, when the selected region is moved to location 140, it may obscure other visible markings already present in that space. In this example the obscured material is represented as 160.

In some applications, a specified pixel intensity, such as white, is predefined as being potentially a transparent value. In others the user specifies a range of pixel colors/intensities to be treated as transparent on one or more layers. In other applications, image processing operations may be applied to the image. If a high-pass filtering operation is available and applied by the user, then that could have the effect of regularizing a mottled or blotchy background of a scanned document so that potentially a small range of color/intensity values could be assigned to set the background to behave transparently.

U.S. Pat. No. 5,548,700 to Bagley et al. titled "Editing Text in an Image" teaches a data structure and procedures for subdividing a document image into smaller raster image objects which collectively become rendered to final image. However, Bagley et al. is directed to keyboard-based editing images of printed text, rather than to mouse or stylus-based editing of more general document images including hand-written scribbles and graphics.

U.S. Pat. No. 5,553,224 to Saund et al. titled "Method for Dynamically Maintaining Multiple Structural Interpretations in Graphics Systems" discloses an approach to maintaining a lattice grouping structure in curvilinear line art in which curvilinear segments with co-terminal endpoints are grouped according to their alignment and corner configurations. However, it does not pertain to arbitrary image objects, but only to curvilinear strokes.

U.S. Pat. No. 5,889,523 to Wilcox et al. titled "Method and Apparatus for Dynamically Grouping a Plurality of Graphic Objects" teaches a cluster tree for dynamically grouping a plurality of graphic objects. The cluster tree is based on a distance metric indicating a distance between a pair of graphic objects, with each level of the cluster tree defining a new cluster of graphic objects. The different cluster levels of the cluster tree containing a selected graphic object are displayable and can be modified to increase or decrease the cluster level of the cluster containing the selected graphic object.

U.S. Pat. No. 5,974,198 to Hamburg et al. titled "Adjustment Layers for Composited Image Manipulation" teaches the use of additional layers in the modification of composited images. Specifically, one or more adjustment layers are applied to an intermediate merged image, generated by compositing previous image layers, and the adjusted result is stored as a temporary image. The temporary image is then composited with the intermediate merged image. Any remaining image layers are then composited in with the intermediate merged image to generate a final merged image.

U.S. Pat. No. 6,028,583 to Hamburg titled "Compound Layers for Composited Image Manipulation" teaches a method for compositing a set of ordered image layers, in which a compound layer contains a plurality of image layers. Image layers under the compound layer are composited to generate a first intermediate image, the first intermediate image is composited with each image layer in the compound layer to generate a second intermediate, the first intermediate image is composited with the second intermediate image according to the compound layer effect to generate a third intermediate image, and the third intermediate image is composited with any remaining image layers to generate a final image.

The present invention offers a new tool for computer assisted drawing, one that incorporates the advantages of paint style image editing programs with a simple and intuitive user interface to provide high functionality for editing document images.

SUMMARY OF THE INVENTION

Briefly stated, and in accordance with one aspect of the present invention, there is disclosed herein a graphical input and display system for creating and manipulating electronic images, permitting a user to manipulate elements of electronic images received from various image input sources. A processor, connected to the system, receives requests for various image editing operations and also accesses a memory structure. The system memory structure includes a user interaction module, which allows a user to enter new image material or select and modify existing image material to form primary image objects, as well as a grouping module, which maintains an unrestricted grouping structure, an output module, and data memory.

In another aspect of the invention, there is disclosed a method for organizing an electronic image entered on a display device into meaningful image objects. After unrestricted existing image material is selected, primary image objects are established in an unrestricted grouping structure. The image material is modified and the unrestricted grouping structure is reconstituted.

In yet another aspect of the invention, there is provided an article of manufacture in the form of a computer usable medium having computer readable program code embodied in the medium. When the program code is executed by the computer, the computer usable medium causes the computer to perform method steps for editing and manipulating an electronic image entered onto a display for the computer. The program readable code causes the computer to decompose the electronic image into primary image objects and also to organize the primary image objects into unrestricted groups of primary image objects such that each primary image object belongs to zero or more groups and each group contains not less than one primary image object. New primary image objects may be created and reorganized into one or more new groups of primary image objects in response to user manipulation of at least one primary image object.

In another aspect of the invention, there is provided a memory for storing data for access by a program being executed on a computer for creating and manipulating data representing an electronic image. The memory includes a lattice data structure, stored in the memory, for providing an unrestricted grouping structure defining the relationships between primary image objects and composite objects. A plurality of primary objects are also stored in the memory, with the primary objects being bitmap objects or curvilinear objects. A plurality of composite objects, with each composite object including at least one primary object, are also stored within the memory. A plurality of hyperlinks link the primary objects with either or both destination and source objects.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and apparatus for editing a document image. In the following description numerous specific details are set forth, such as calculations for character spacings for performing deletion and insertion operations, in order to provide a thorough understanding of the present invention. It would be apparent, however, to one skilled in the art to practice the invention without such specific details. In other instances, specific implementation details such as parsing techniques for extracting characters from a document image, have not been shown in detail in order not to unnecessarily obscure the present invention.

It should be noted that a document image is simply a bit-mapped representation of an image obtained through a scanning process, video source, screen snapshot, digital camera, digital ink input device, or any other document source known in the art. The present invention could be used with any document having a bit-mapped representation. For example, frame grabbers are used to capture bit-mapped representations of images from a video source. Such bit-mapped representations can be edited on systems embodying the present invention. Further, the terms scanned document image, bit-mapped representation of an image, and bit-mapped image are used interchangeably herein and are taken to have the equivalent meaning.

As will become apparent in the description below, the present invention finds particular advantage in editing text and line art contained in an image. Documents which are faxed or which are copied on a digital copier typically involve images that contain primarily text and graphics. As described with respect to the prior art, it is common that in order to edit any of the text contained in the image, extraneous processing such as Optical Character Recognition (OCR) or the placement of image information into layers must be performed. As will become apparent, the present invention minimizes extraneous processing and provides added flexibility to defining both text and graphical image information so as to allow the editing of a wider range of textual and graphical data in an image.

Figure 1:
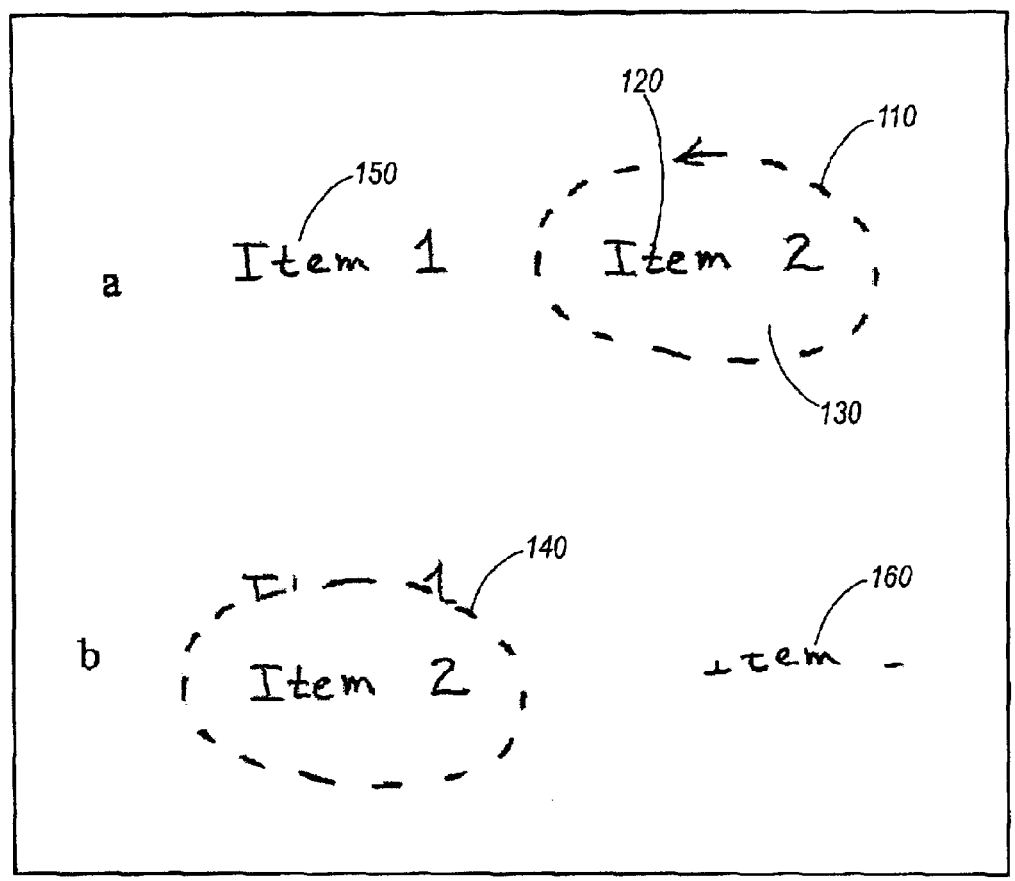
FIG. 1 illustrates the need for transparency in document editing programs.
Figure 2A:
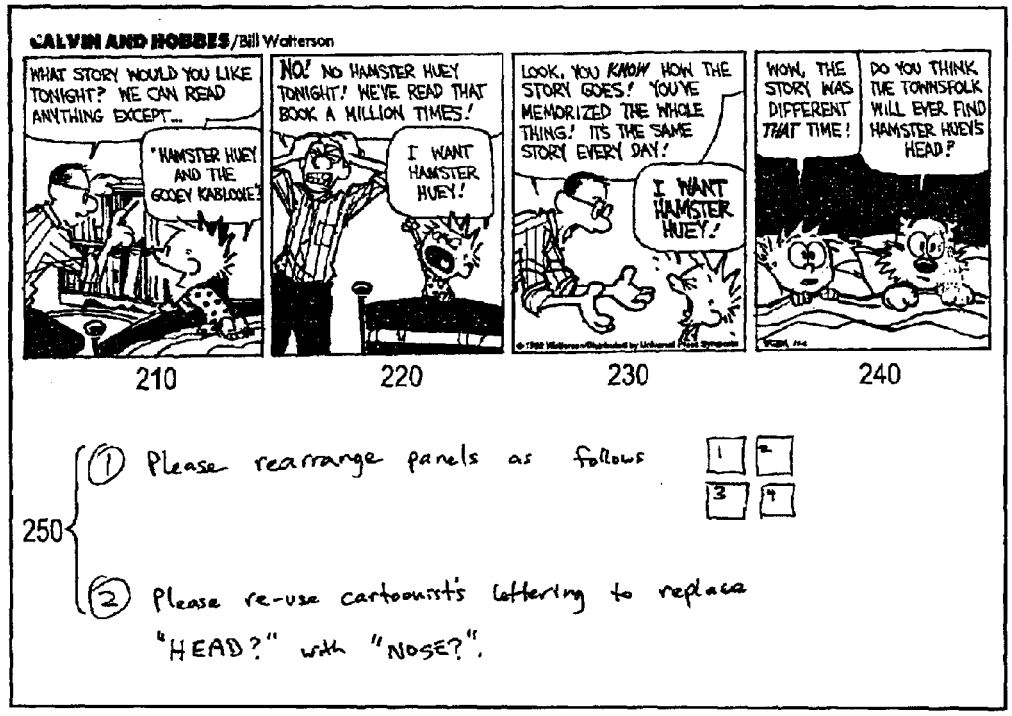
FIG. 2a shows a sample graphical image to be modified according to the invention.
Figure 2B:
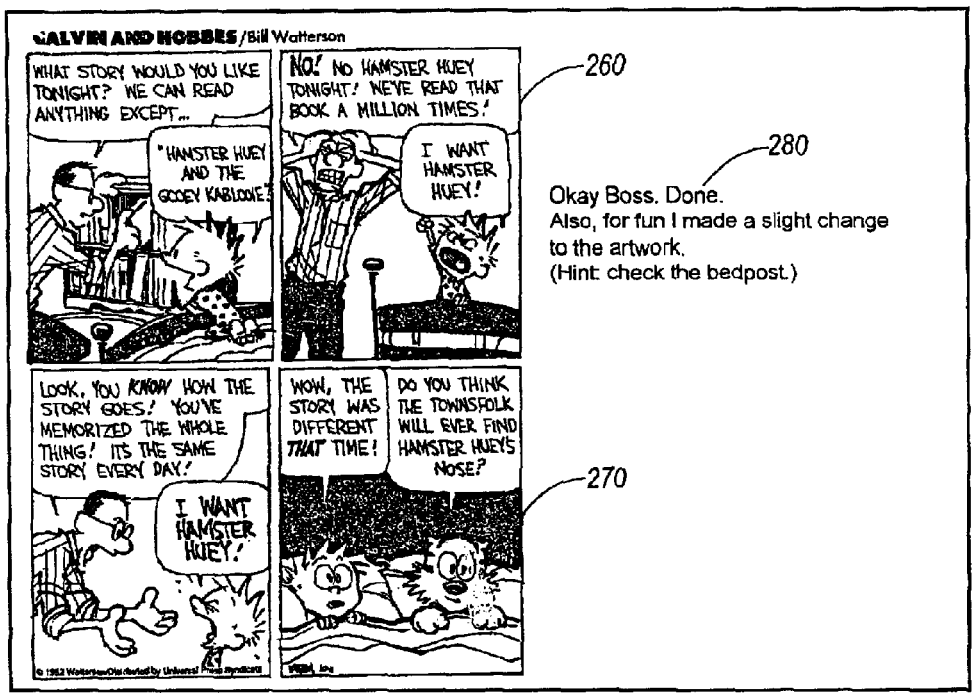
FIG. 2b shows the sample graphical image of FIG. 2a after modification according to the invention.

An illustration of the use of the present invention is shown in FIGS. 2a and 2b. FIG. 2a was captured as an electronic image from a newspaper and contains frames 210, 220, 230, and 240 as well as comments 250. FIG. 2b was constructed with a few short operations of the present invention by selecting frames 230 and 240 and rearranging them such that frames 230 and 240 are located beneath frames 210 and 220. The word "head" was selected in frame 240 and replaced by the word "nose", which was created by borrowing other characters in the graphics, duplicating them, and moving them into position, in frame 270. Similarly, the bedpost of original frame 220 was selected and modified in length as shown in frame 260. Comments 250 were deleted from FIG. 2a, and replaced with comments 280 in FIG. 2b. Because existing paint-style or structured graphics style image editing tools are not designed to support this kind of editing of document images, the task of creating FIG. 2b from FIG. 2a could be done only with substantial difficulty, or not at all, using available programs.

A number of terms are used herein to describe images and related structures, and the terms defined below have the meanings indicated throughout this application, including the claims.

"Character" means a discrete element that appears in a writing system. Characters can thus include not only alphabetic and numerical elements, but also punctuation marks, diacritical marks, mathematical and logical symbols, and other elements. More generally, characters can include, in addition to alphanumeric elements, phonetic, ideographic, or pictographic elements. A "character type" is a category of which a character may be an instance, such as the letter "a" or the number "3".

A "word" is a set of one or more characters that is treated as a semantic unit in a language. A "text" is an arrangement of one or more lines of characters; the characters of a text may form words.

An "image" is a pattern of light. An image may include characters, words, and text as well as other features such as graphics.

A "data structure" is any combination of interrelated items of data. An item of data is "included" in a data structure when it can be accessed using the locations or data of other items in the data structure; the included item of data may be another data structure. Conversely, an item of data can be "removed" from a data structure by rendering it inaccessible, such as by deleting it. An "array of data" or "data array" or "array" is a data structure that includes items of data that can be mapped into an array. A "two-dimensional array" is a data array whose items of data can be mapped into an array having two dimensions.

A data structure can be "obtained" from another data structure by operations that produce the data structure using data in the other data structure. For example, an array can be "obtained" from another array by operations such as producing a smaller array that is the same as a part of the other array, producing a larger array that includes a part that is the same as the other array, copying the other array, or modifying data in the other array or in a copy of it.

A "data unit" is an item of data that is accessible as a unit within a data structure. An "array data unit" is a data unit that includes data sufficient to define an array; for example, and array data unit may include the defined array itself, a compressed or encoded form of the defined array, a pointer to the defined array, a pointer to a part of another array from which the defined array can be obtained, or pointers to a set of smaller arrays from which the defined array can be obtained.

Data "defines" an image when the data includes sufficient information to produce the image. For example, a two-dimensional array can define all or any part of an image, with each item of data in the array providing a value indicating the color of a respective location of the image. A "character-size array" is a two dimensional array that defines only one character or character-size element.

Each location or single picture element of an image may be called a "pixel." Taken collectively, the pixels form the image. In an array defining an image in which each item of data provides a value, each value indicating the color of a location may be called a "pixel value". Each pixel value is a bit in the "binary form" of the image, a gray-scale value in a "gray-scale form" of the image, or a set of color space coordinates in a "color coordinate form" of the image. The binary form, gray-scale form, and color coordinate form each being a two-dimensional array defining the image. In addition, pixel values can represent transparency. "White" or background pixels in a binary image may be treated as transparent, revealing any black pixels previously rendered into the display. Similarly, one or more values of a gray-scale image may be reserved to represent transparency. And a transparency channel, or "alpha" channel, can be associated with color pixels to represent degree of transparency or opacity of the pixel's color value with respect to pixels "below", or previously rendered into the display data structure.

"Bitmap" refers to bits stored in digital memory in a data structure that represents the pixels. As used herein, "bitmap" can refer to both a data structure for outputting black and white pixels, where each pixel either is on or off, as well as a "pixel map" having more information for each pixel, such as for color or gray scale pixels. "Resolution" refers to the size, shape, and separation of pixels of a displayed or printed image. For example, a displayed bitmap of very small pixels, closely spaced, has a greater resolution, i.e. greater detail, than a displayed bitmap having large pixels widely spaced. "Render" refers to the creation of a bitmap from an image description, such as a character outline.

A "Bitmap Object" is a raster image, plus an (x, y) coordinate indicating the positioning of the "Bitmap Object" on a visible electronic canvas. The pixels in a "Bitmap Object" may take any color values, or the value "transparent". Transparency may alternatively be represented by an associated alpha binary raster image indicating which pixels are transparent. Any given source image may be represented as a single "Bitmap Object", or as a collection of several component "Bitmap Objects", appropriately positioned. These alternative representations may be unapparent to the user and not detectable by inspection when the result is displayed by displaying the collection of "Bitmap Objects" at their respective positions.

"Raster" refers to the arrangement of pixels on an output device that creates an image by displaying an array of pixels arranged in rows and columns. Raster output devices include laser printers, computer displays, video displays, LCD displays, etc. "Coded" data is represented by a "code" that is designed to be more concise and to be more readily manipulated in a computing device than raw data, in, for example, bitmap form. "Non-coded" data is data that is not represented by a code. For example, the lowercase letter "a" can be represented as coded data, e.g., the number 97 in ASCII encoding, or as non-coded graphical or image data that could be used to create the appearance of "a" on an output device such as a display screen or printer. Fonts usually have one or more associated "encodings" that associates coded data with non-coded data.

A "version" of a first image is a second image produced using data defining the first image. The second image may be identical to the first image, or it may be modified by loss of resolution, by changing the data defining the first image, or by other processes that result in a modified version. A "view" of an image is a version of the image that is displayed to a user; a view can omit some details of the image or can be otherwise modified.

A "text editing operation" is an operation that assumes that the data on which it is performed defines lines of elements that can be treated as if it were text. Examples of text editing operations include inserting and deleting elements, changing a characteristic of an element such as typeface, changing alignment and spacing, cursor positioning, justification, moving characters or a cursor to a following line, searching for a character or sequence of characters, and so forth.

A "character level text editing operation" is a text editing operation that affects a character or character-size element in text being edited. Examples of character level text editing operations include inserting, deleting changing, or positioning a character; positioning a cursor on a character; searching for a character; and so forth.

A "Primary Image Object" or "Primary Object" is a graphical element out of which larger graphical structures may be composed and may include a Bitmap Object, but may also include other objects as well, such as a pen-stroke object. A "Primary Object" is not immutable and may be fragmented by being broken into smaller "Primary Objects" or enlarged by merging with other "Primary Objects". A "Composite Object" is associated with a set of "Primary Objects" and thereby refers to individual or combinations of elementary graphical entities. Under this interpretation, "Primary Objects" are directly associated with the rendered appearance of pixels in the image; "Composite Objects" refer to the physical appearance of the image only through the "Primary Objects" upon which they are constructed. The set of "Composite Objects" associated with an image constitutes the set of abstract objects by which the user gains access to perceptually coherent collections of image marks. Both types of object are attributed with the properties of spatial location, rough orientation, size, plus miscellaneous other properties.

A "connected component" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "connected component set" or "component set" is a set of connected components that are treated as a unit. A character can therefore be a component set; for example, the letter "i" includes two connected components that are treated as a single character in English text-the connected components "form" the character. A "bounding box" for a character or other component set is a rectilinear region just large enough to include all the pixels in the component set and extends to the minimum and maximum extent in the vertical and horizontal directions.

The data used to produce a modified version of an image that includes text can include information about a character in the text. "Identity information" about a character is information identifying its character type, case, typeface, point size, or the like. To "recognize" a character means to obtain identity information about the character from a digital form of an image that includes the character. "Spatial information" about a character is information identifying its spatial characteristics, such as its size, shape, position, orientation, alignment with other characters, or the like. Although spatial information and identity information are not completely independent, spatial information about a character can be obtained from a two-dimensional array defining an image without recognizing the character.

Figure 3:
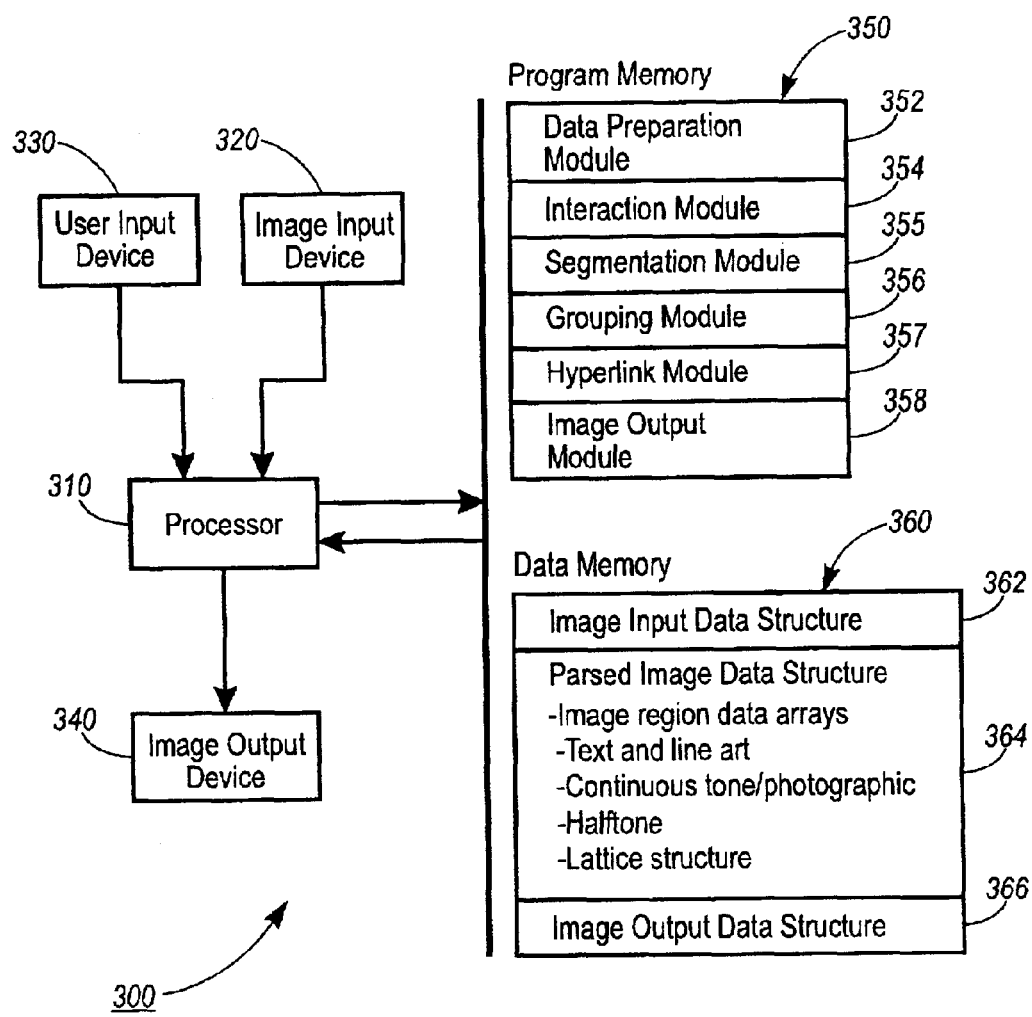
FIG. 3 is a block diagram showing general components of a system that can edit images according to the invention.

Referring now to FIG. 3, system 300 includes processor 310, connected to receive signals from image input device 320 and user input device 330. Image input device 320 could be a scanner, a facsimile receiver or other image receiver, a camera, or other appropriate device or could be a part of local or remote memory that stores an image in digital form. User input device 330 could, for example, be a keyboard with a mouse. Processor 310 can also be connected to image output device 340, such as a screen display, a printer, a facsimile transmitter or other image transmitter, or a part of local or remote memory that can store an image in digital form.

Processor 310 is also connected to access program memory 350 and data memory 360. Program memory 350 includes data preparation module 352, user interaction module 354, grouping module 356, hyperlink module 357, and image output module 358. Data memory 360 includes image input data structure 362, parsed image data structure 364 and image output data structure 366.

In executing the routines of data preparation module 352, processor 310 loads data from image input device 320 into image input data structure 362, which is equivalent to a two-dimensional data array. Processor 310 then performs data preparation which prepares image objects and groups for convenient access by the user.

Data preparation module 352 makes use of several data structures and processing modules. As shown, parsed image data structure 364 includes one or more subsidiary data structures called image region data arrays. Each image region data array includes one or more array data units, each defining text and line art data, continuous tone or photographic data, or halftone data. Image region arrays are given representation by Primary Image Objects in the form of Bitmap Objects. Segmentation module 355 decomposes textual and graphical image material into smaller elementary Bitmap Objects or Primary Image Objects of other types.

Grouping module 356 is responsible for maintaining, and at some times constructing, the lattice of relationships between Primary Image Objects and Composite Objects even as Primary Image Objects are split, moved, and merged. Grouping module 356 also contains automatic recognition routines to identify perceptually meaningful groups that should be represented by Composite Objects. Hyperlink Module 357 establishes hyperlinks to and from arbitrary regions of electronic images reflecting image structure that may be perceptually salient to human users but not represented by independent data objects, and is discussed in more detail hereinbelow.

Some stages of data preparation involve decomposing textual and graphical image material into smaller Primary Image Objects, then performing grouping operations to form groups of fragments representing visually apparent structures. Under the control of a user option, these stages may or may not be performed automatically by the data preparation module 352, and these stages may also be invoked by the user through the User Interaction Module 354.

Figure 4:
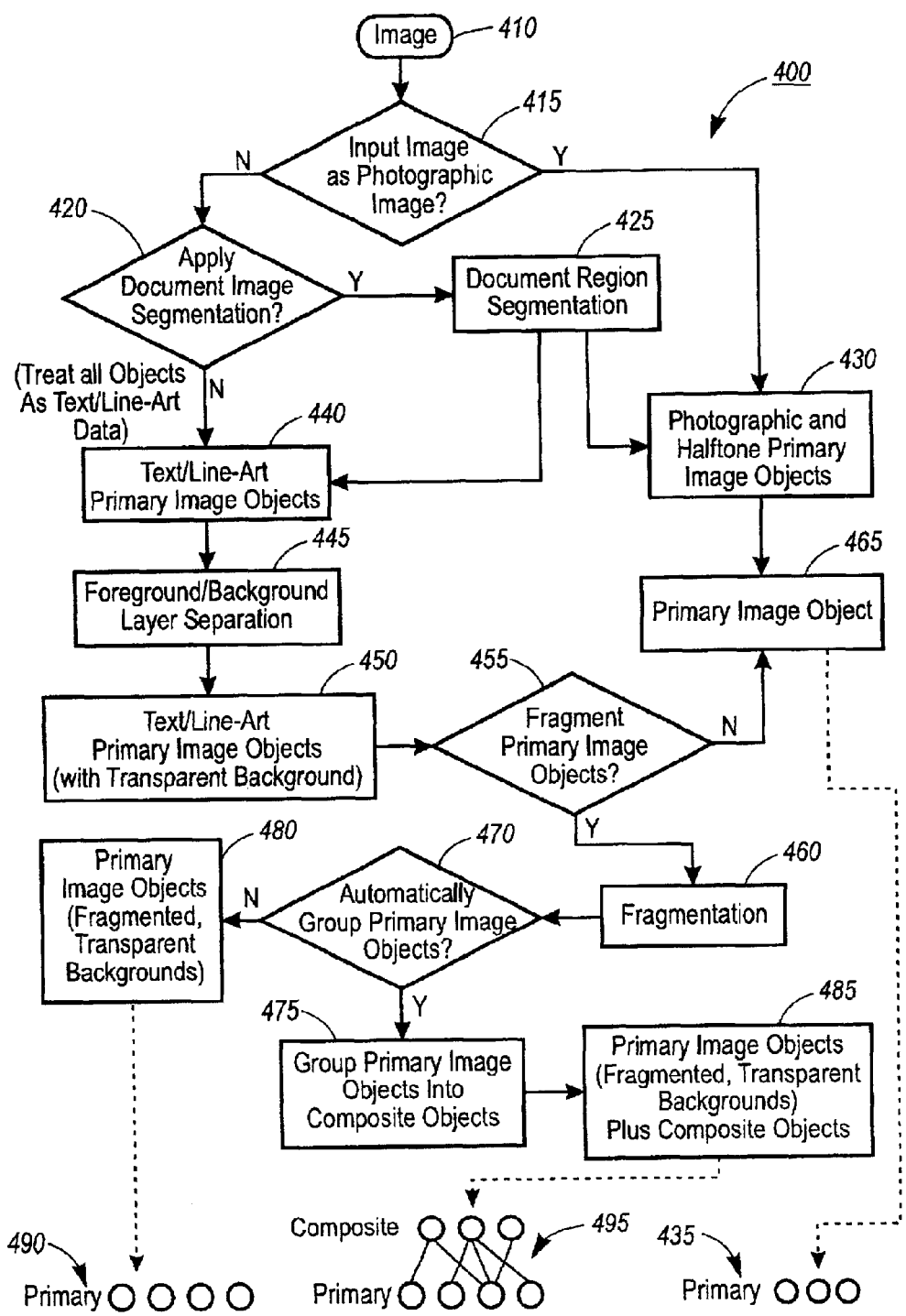
FIG. 4 is a flow chart showing steps in preparing graphical data for editing according to the invention.

FIG. 4 illustrates the steps in data preparation executed by data preparation module 352, discussed in relation to FIG. 3. Initially a source image is received at step 410 and a determination is made at Step 415 as to whether the received image is to be treated as a continuous-tone photograph. This determination can be automatic or established as a user-controlled option. If the image is to be treated as a photograph, it is passed to Step 430.

If the image is not to be treated as a photograph, a decision is made at step 420 as to whether to perform document image segmentation. If document image segmentation is to be applied to the image, then at step 425, document image segmentation processes known in the art are performed in which the image is segmented into image regions of three classes: text and graphics, continuous-tone/photographic, and halftone. Continuous-tone/photographic and halftone image regions are passed to Step 430, where Bitmap Objects are created to represent them. These become Primary Image Objects 435 to be operated on through a user's editing commands by User Interaction Model 354. Text and line art/graphics regions are passed to Step 440. If document image segmentation is not to be applied to the image as determined by a user controlled option at Step 420, then the entire image is treated as text and line-art or graphics, as depicted by Step 440.

At step 445 an image processing operation is performed to distinguish foreground from background pixels. In document images, foreground pixels are typically darker than the surrounding background. Various filtering operations, such as those disclosed in applicant's U.S. patent application Ser. No. 09/158,443, may be utilized to classify background pixels as such. At step 450 these pixel values are made "transparent" by setting appropriate transparency bits for these pixels.

At optional step 455, a determination is made as to whether to break the processed source image into a multiplicity of elemental Bitmap Objects, each of which is a natural candidate for selection by users. For example, at step 460 the Bitmap Objects may be segmented into a larger number of smaller Bitmap Objects corresponding to character-size connected components of foreground pixels, and relatively straight segments of line art, as is described in U.S. patent application Ser. No. 09/199,699. Alternatively, the unfragmented Bitmap Objects may be passed to output step 465.

At step 470 a determination will be made as to whether to perform an optional step 475 to identify significant collections of elemental Bitmap Objects into Composite Objects, or groups. For example, the character-size Bitmap Objects forming words, lines of text, and columns of text would form desirable groups. Procedures for performing this grouping are described in more detail hereinbelow. These grouped Primary Image Objects and Composite Objects from step 475 are passed to step 485 as fragmented Primary Image Objects with transparent backgrounds organized into Composite Objects in a lattice structure, shown at 495. If the Primary Objects are not to be grouped, with resulting groups represented by Composite Objects, they are passed to step 480 as a plurality of fragmented Primary Image Objects with transparent backgrounds, shown at 490. As a result of the data preparation stage, one or more Bitmap Objects is created. Bitmap Objects representing text and graphical image material have their foreground pixels visible and their background pixels transparent, and Composite Objects are constructed.

Figure 5:
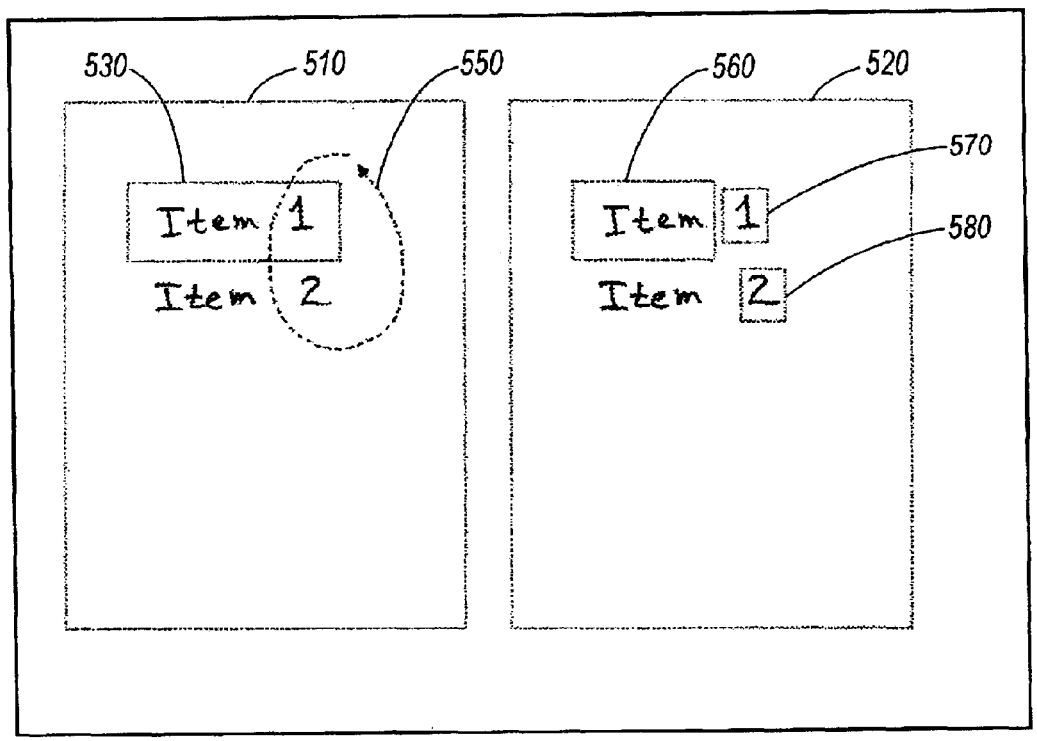
FIG. 5 shows an approach to the creation of Bitmap Objects according to one embodiment of the invention.

During the user interaction stage, the user participates in an interaction cycle in which new image material may be entered by typing or drawing with the mouse or stylus, or may be copied from a clipboard data structure either from within the application or from an outside application. Alternatively, the user may select and modify existing image material, which is illustrated in FIG. 5. In FIG. 5 the visible image is represented in terms of image material falling on a large Bitmap Object 510 (shown within its bounding box), and a smaller Bitmap Object 530, also shown within its bounding box and positioned within the boundaries of Bitmap Object 510. In this example, Bitmap Object 530 includes "Item 1"; Bitmap Object 510 also includes the phrase "Item 2". The user may select an image region containing some material from both Bitmap Object 510 and Bitmap Object 530. In this case the selection region is represented by dashed curve 550. This selection creates two new Bitmap Objects 570 and 580 (shown within their respective bounding boxes), that separate foreground material in the newly selected regions. New Bitmap Objects 570 and 580 also remove the material "1" from Bitmap Object 530 leaving it as shown in 560, and change the background bitmap object to only having the word "Item" but not the word "2", as illustrated on Bitmap Object 520, also shown within its bounding box. Corresponding foreground pixels in regions 510 and 530 are set to the value "transparent". The data structure is now ready for the user to perform any transformation operation, such as moving image material in 570 and 580 to some other location, leaving behind empty space (transparent background pixels in 510).

Figure 6:
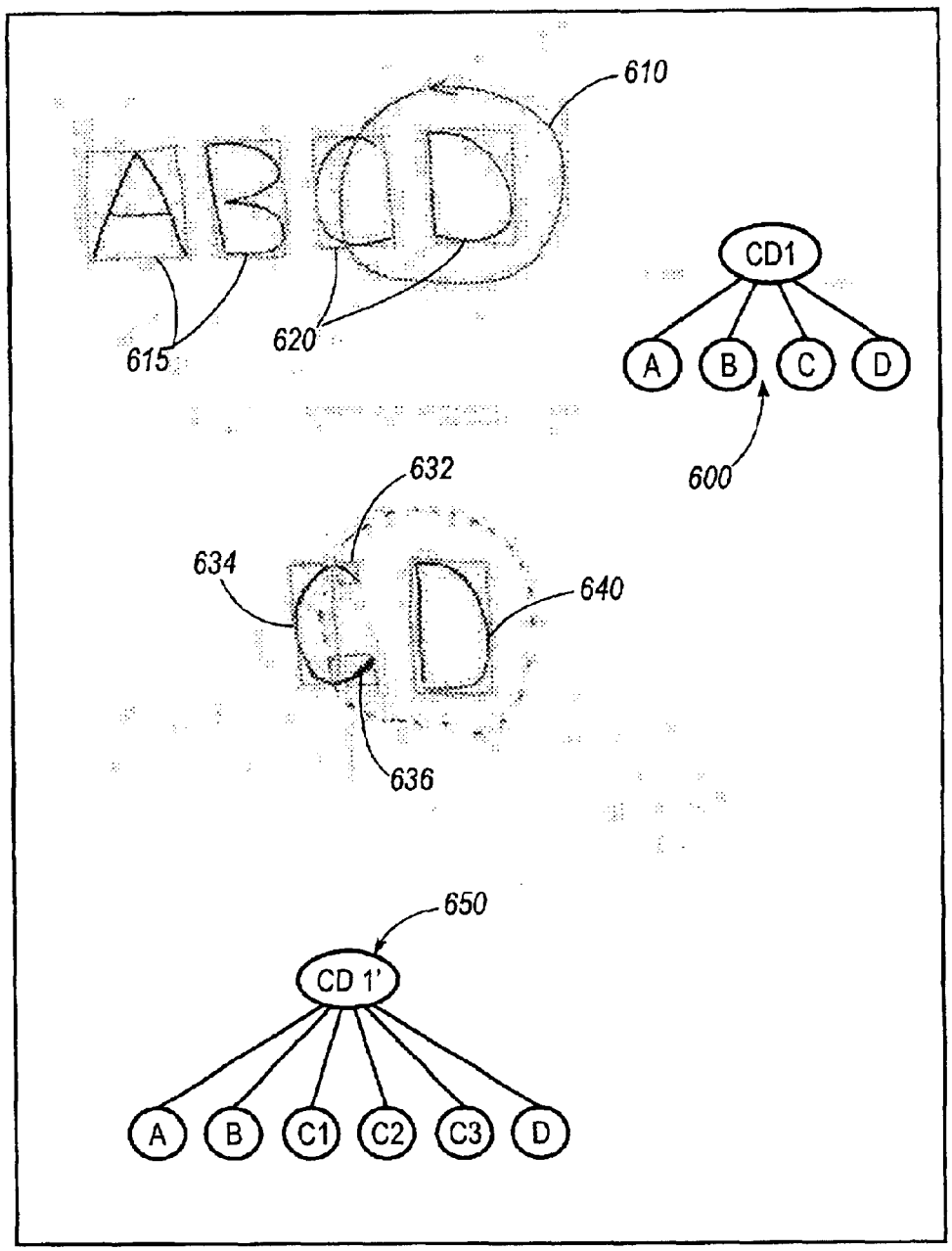
FIG. 6 illustrates splitting a Primary Object by selection following the steps of FIG. 7.
Figure 7:
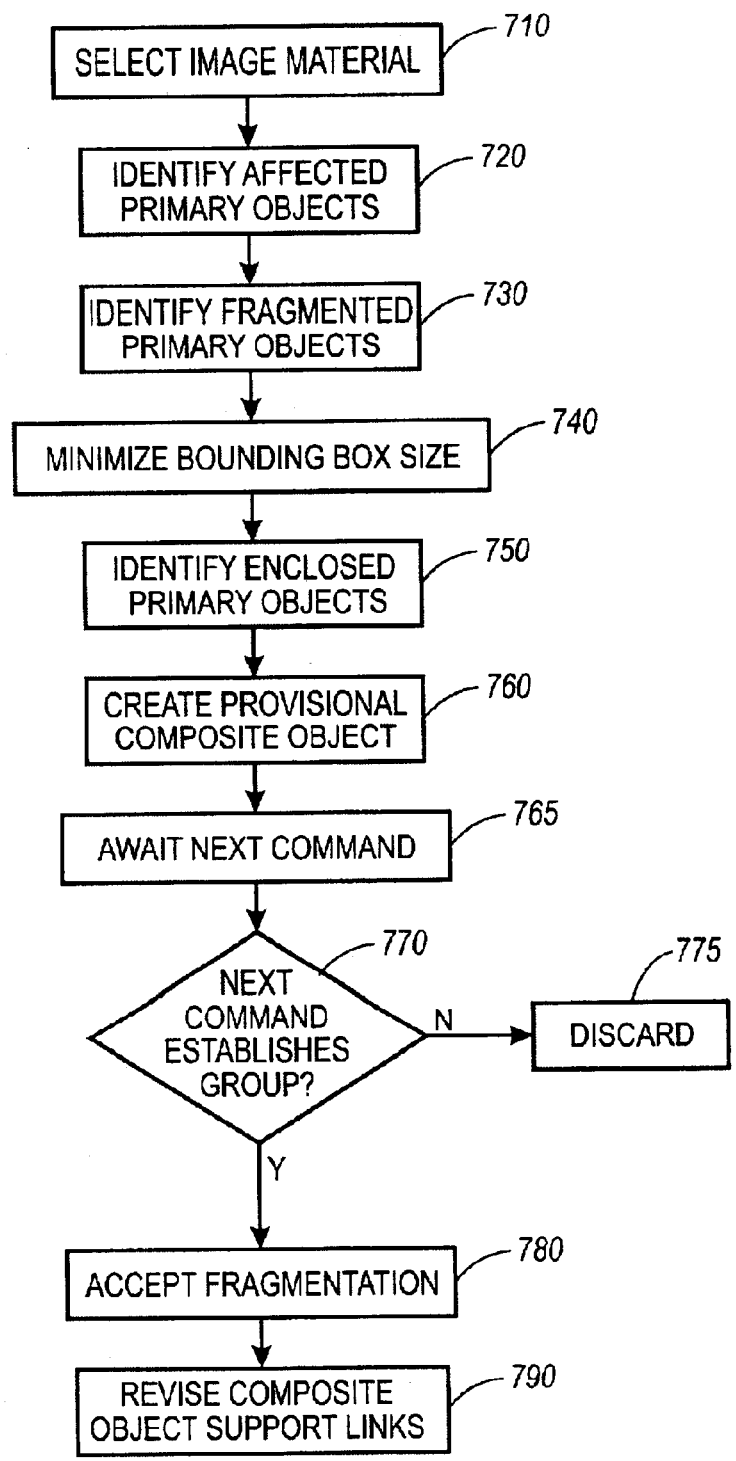
FIG. 7 is a flow chart showing steps of splitting a Primary Object by selection.

Referring now to FIGS. 6 and 7, FIG. 7 is a flow diagram illustrating one possible user interaction procedure in which Primary Objects may be split or fragmented through user selection. FIG. 6 is a diagrammatic illustration showing the operations of the method described by the flow chart of FIG. 6. Beginning with original grouping structure 600 having Primary Objects "A", "B", "C" and "D" in a Primary Object list, and forming Composite Object "CO1", at step 710 image material is selected by inputting closed path 610 to enclose the desired material from the Primary Objects. Although for the purposes of this example material is selected through use of a freeform path, it is noted that multiple other means may be used, such as rectangle dragging, polygon selection, selection of established primitive image objects with a single mouse click, selection of established groups of image objects with multiple mouse clicks, and editing of group structure by depressing a single prespecified key, for example the shift key, while performing selection operations. The desired material may contain one or more objects, such as text characters and words or other shapes. It will be noted that each Primary Object "A", "B", "C" and "D" possesses a corresponding bounding box 615. At step 720 the processor detects the Primary Objects intersected or enclosed by the selection path and identifies them as the affected Primary Objects 620. The affected Primary Objects' bitmaps are broken into fragments according to the selection path at step 730 and as illustrated in FIG. 6 as fragmented Primary Objects. It will be noted that for this example three fragmented Primary Objects 632, 634 and 636 are formed. The bounding box size of each of the fragmented Primary Objects is reduced to the minimal bounding box size of the foreground material for each fragmented Primary Object at step 740 and fragments containing no foreground pixels are eliminated. At step 750 the processor gathers the fragmented Primary Objects and non-fragmented affected Primary Objects enclosed by the selection path to form enclosed Primary Objects 632, 634, 636, and 640. The processor then creates a new provisional Composite Object representing the group of enclosed Primary Objects at step 760. At this point the user has performed a selection operation and the system completes its tasks and at step 765 pauses for receipt of a next command. At step 770 a determination is made as to whether the next command establishes a group. If a group is not to be established, the processor discards the fragmented Primary Objects and the provisional Composite Object at step 775. If a group is to be established, the fragmentation is accepted. The processor then removes the affected Primary Objects from the original Primary Object List and adds the fragmented Primary Objects to the Primary Object List at step 780. At step 790 the processor locates Composite Objects supported by the affected Primary Objects. For each such Composite Object, the processor replaces its support by the affected Primary Objects with support links to enclosed Primary Objects. The new grouping structure 650 reflects a new Composite Object "CO1" supported by original Primary Objects "A" and "B" and fragmented primary objects "C1" (corresponding to fragmented Primary Object 632), "C2" (corresponding to fragmented Primary Object 634), and "C3" (corresponding to fragmented Primary Object 636) and enclosed Primary Object "D".

Figure 8:
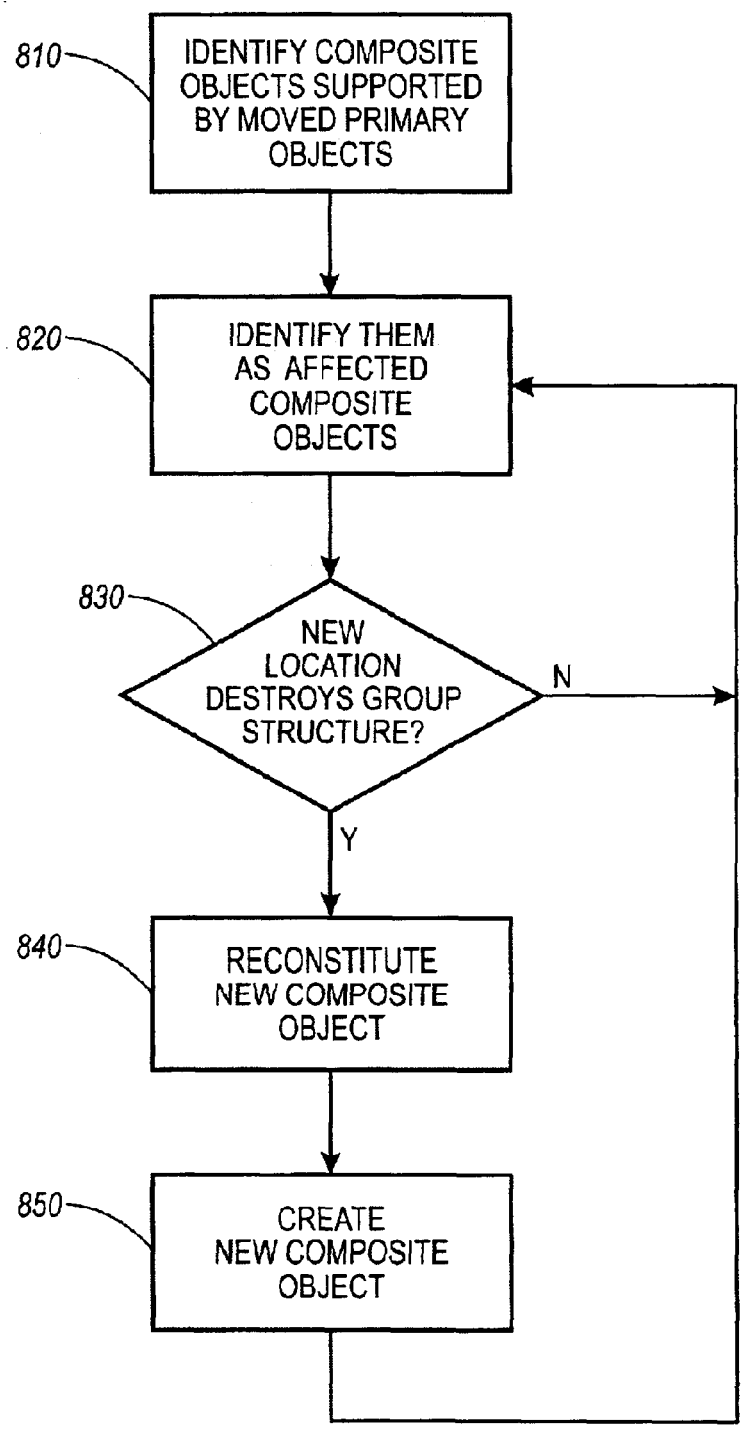
FIG. 8 is a flow chart showing steps for reconstitution of the grouping structure.
Figure 9:
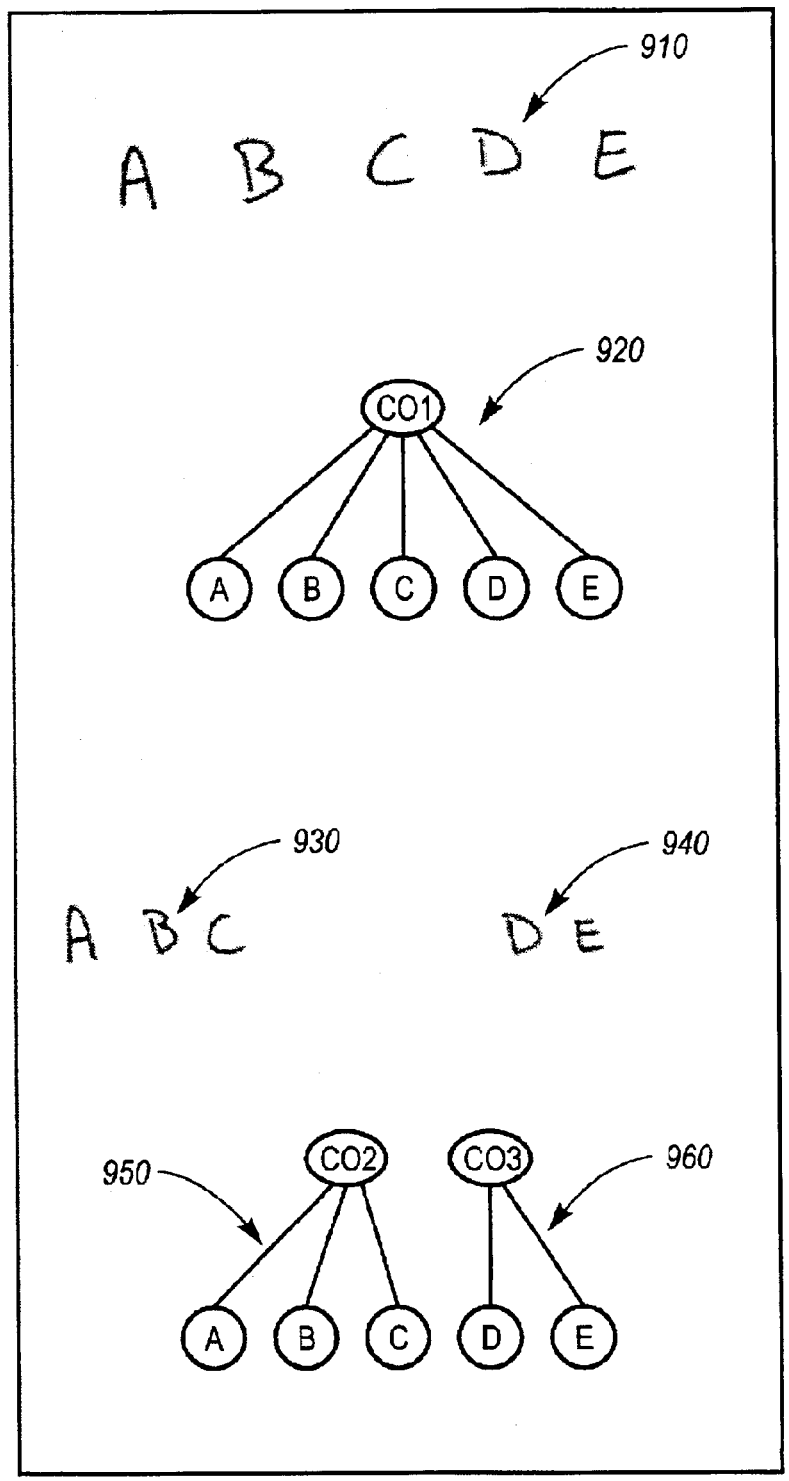
FIG. 9 illustrates reconstitution of a grouping structure following the steps of FIG. 8.

The automatic reconstitution of the grouping structure that the processor performs is shown in the flow diagram of FIG. 8 and is illustrated diagrammatically in FIG. 9. Referring first to FIG. 9, an initial spatial arrangement may contain, for example, five Primary Objects "A", "B", "C", "D" and "E", identified as initial spatial arrangement 910. Although for the purposes of this discussion text letters are used, it will be appreciated that the spatial arrangement may contain any combination of text or graphical figures or elements. These Primary Objects support a first Composite Object 920 in an initial grouping structure. When some of the Primary Objects are moved a distance sufficient to destroy the group structure, two new spatial arrangements of Primary Objects are formed, arrangements 930 and 940. Alternatively, orientation, color, shape similarity, size similarity, or other properties may be used as criteria for destroying the group structure. Two new Composite Objects are then reconstituted such that spatial arrangement 930 is represented by new Composite Object 950 and spatial arrangement 940 is represented by new Composite Object 960.

Referring back to FIG. 8, the flow diagram shows the procedure the processor follows in automatically reconstituting a grouping structure. Initially, the processor determines which, if any, Composite Objects are supported by moved Primary Objects at step 810 and identifies them as affected Composite Objects at step 820. The processor then determines whether the new locations of the moved Primary Objects are sufficiently removed from the original spatial arrangement so as to destroy group structure at step 830. If the processor determines that group structure has been destroyed, at step 840 the processor reconstitutes a new Composite Object containing those Primary Objects which were not moved. The processor then creates a new Composite Object supported by those Primary Objects that were moved at step 850 and returns to step 820 to repeat steps 820, 830, 840 and 850 for the next Composite Object.

Figure 10:
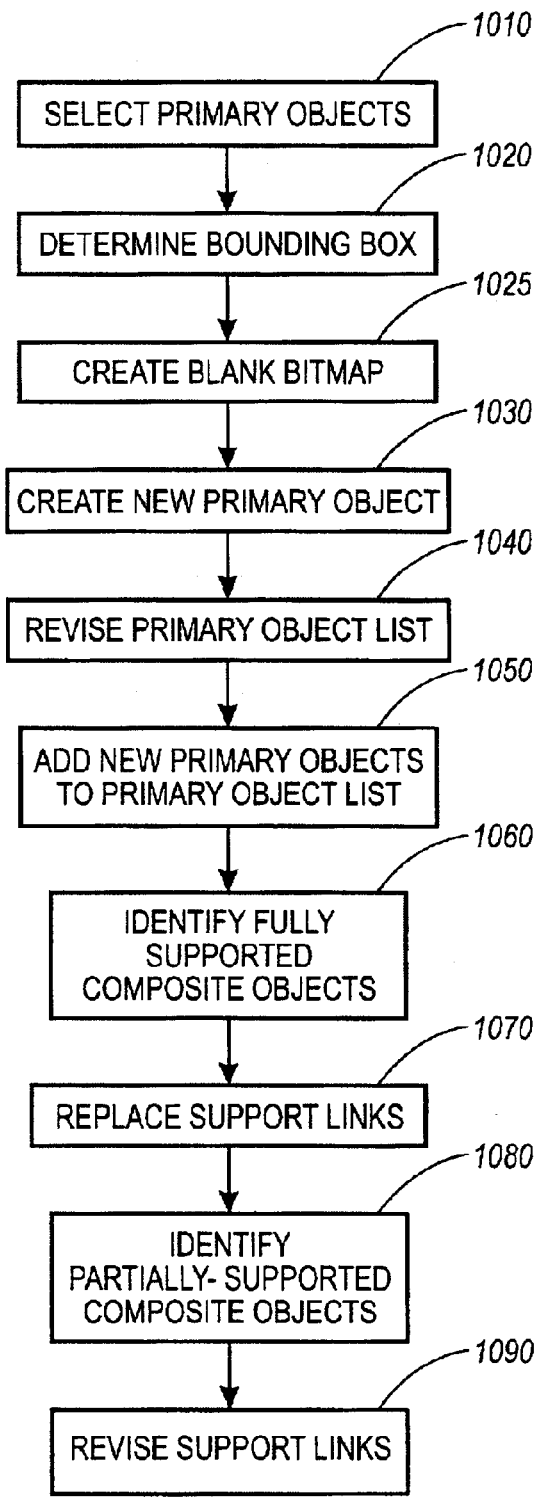
FIG. 10 is a flow chart showing steps for the creation of new Primary Objects through merging.

Referring now to FIG. 10, the flow chart illustrates the steps for creation of a new primary object and revision of the composite object structure through use of a merge command. At step 1010 the user selects Primary Objects to be merged. The processor determines the bounding box for the union of the selected Primary Objects at step 1020. The bounding box will always be the minimum size to accommodate the union of the Primary Objects. A new blank bitmap corresponding to the size of the bounding box is created at step 1025. At step 1030 the processor copies the foreground material from all selected Primary Objects into the new bitmap and creates a new Primary Object for this new bitmap. The selected Primary Objects are then removed from the original Primary Object list at step 1040. At step 1050 the processor adds the new Primary Object to the original Primary Object list. The processor then locates Composite Objects supported by all selected Primary Objects and identifies these as fully supported Composite Objects at step 1060. For each fully supported Composite Object, the processor replaces the support links from the selected Primary Objects with a support link to the new Primary Object at step 1070. At step 1080 the processor locates Composite Objects containing Primary Objects that are not part of the selected objects as well as a subset of selected Primary Objects and identifies these as partially-supported Composite Objects. For each partially supported Composite Object, the processor removes all support links to the Primary Objects to eliminate the partially-supported Composite Objects from the link graph representing the grouping structure at step 1090.

Figure 11:
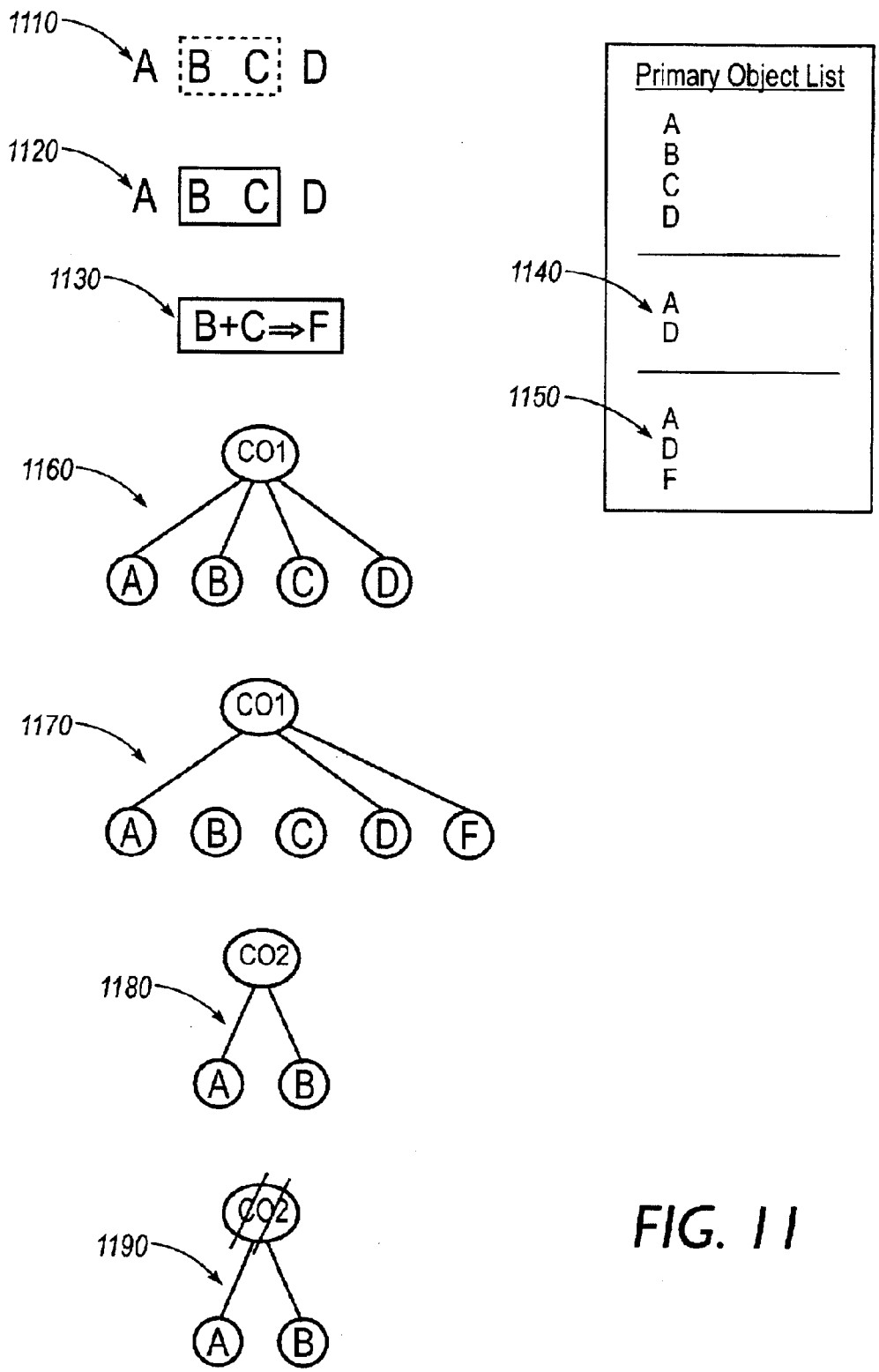
FIG. 11 illustrates creation of new Primary Objects following the steps of FIG. 10.

This method is illustrated in FIG. 11 which shows the merging steps and the resulting effect on an example Primary Object List. Merging takes place within the grouping module, described hereinabove, and occurs during the user interaction stage of system operation. By way of example, an initial Primary Object List may contain the elements "A", "B", "C" and "D". At step 1110 a set of Primary Objects appearing on the Primary Object List is identified and several of these Primary Objects, in this example "B" and "C" are selected to form the merged Primary Object. The bounding box for the union of the selected Primary Objects is determined at step 1120. At step 1130, as foreground material from all the selected Primary Objects is copied into a new bitmap, a new Primary Object for the new bitmap is created. Thus the union of "B" and "C" to form new Primary Object "F" results in the removal of the Primary Objects "B" and "C" from the Primary Object List at 1140 and the addition of the new Primary Object "F" to the Primary Object List at 1150.

The processor next locates Composite Objects supported by all selected Primary Objects and identifies these as fully supported Composite Objects at 1160. As illustrated here, fully supported Composite Object "CO1" is supported by Primary Objects "A", "B", "C" and "D". At step 1170, the processor removes the support links from the selected Primary Objects "B" and "C" and replaces them with a support link to the new Primary Object "F". The processor then locates Composite Objects that contain some but not all of the selected Primary Objects as well as other non-selected Primary Objects and identifies these as partially-supported Composite Objects at step 1180. In the example, partially-supported Composite Object "CO2" contains Primary Objects "A" and "B". For each partially-supported Composite Object, the processor removes all support links to the Primary Objects, thus eliminating "CO2" from the grouping structure at step 1190. Alternatively, in the case in which a partially-supported Composite Object contains multiple non-selected Primary Objects, a choice may be made to either demolish or retain the partially-supported Composite Objects.

In the case in which the partially-supported Composite Objects are retained, only the support links to the selected Primary Objects are removed. For the purposes of this example, the partially-supported Composite Object contained only one Primary Object other than a member of the selected Primary Objects, resulting in the elimination of Composite Object "CO2" from the grouping structure upon removal of the selected Primary Object support link, since a Composite Object must contain more than one Primary Object. However, in those cases in which the partially-supported Composite Object contains a plurality of non-selected Primary Objects in addition to a subset of the selected Primary Objects, when the support links to the selected Primary Objects are removed, the partially-supported Composite Object survives as a Composite Object containing the remaining non-selected Primary Objects.

Referring now to FIGS. 12A–D, 12A shows nine possible Primary Objects "A", "B", "C", "D", "E", "F", "G", "H" and "I" arranged in rows and columns and belonging to a Primary Object List. These Primary Objects may be grouped in a row type grouping illustrated in FIG. 12B. Here Primary Objects "A", "B" and "C" support Composite Object "R1"; Primary Objects "D", "E" and "F" support Composite Object "R2"; and Primary Objects "G", "H" and "I" support Composite Object "R3". Alternatively, FIG. 12C shows a column grouping in which Primary Objects "A", "D" and "G" support Composite Object "C1"; Primary Objects "B", "F" and "I" support Composite Object "C2"; and Primary Object "C", "F" and "I" support Composite Object "C3". In existing graphics image editors, both groupings cannot be available simultaneously, in a lattice, as shown in FIG. 12D. In a lattice grouping, any unrestricted subset of primary objects can be grouped into a composite object such that primary objects may support multiple Composite Objects. In this example, Primary Object "A" supports both Composite Objects "R1" and "C1" and Primary Object "B" supports Composite Objects "R1" and "C2", etc. This lattice is represented in terms of lists and pointers between objects.

Groups may be created in numerous ways, for example, the user may select a set of objects and establish them as a group that is independent of other groups of which these objects may be a member, through an explicit menu command. Alternatively, the user may select a set of objects and have the processor create a group automatically by virtue of the user's moving, rotating, scaling, or otherwise operating on the collection of objects. The processor may also create groups automatically by the application of image analysis processes that identify significant groups in the image. One approach to identifying groups of connected components that form words is illustrated in FIG. 13.

Figure 13:
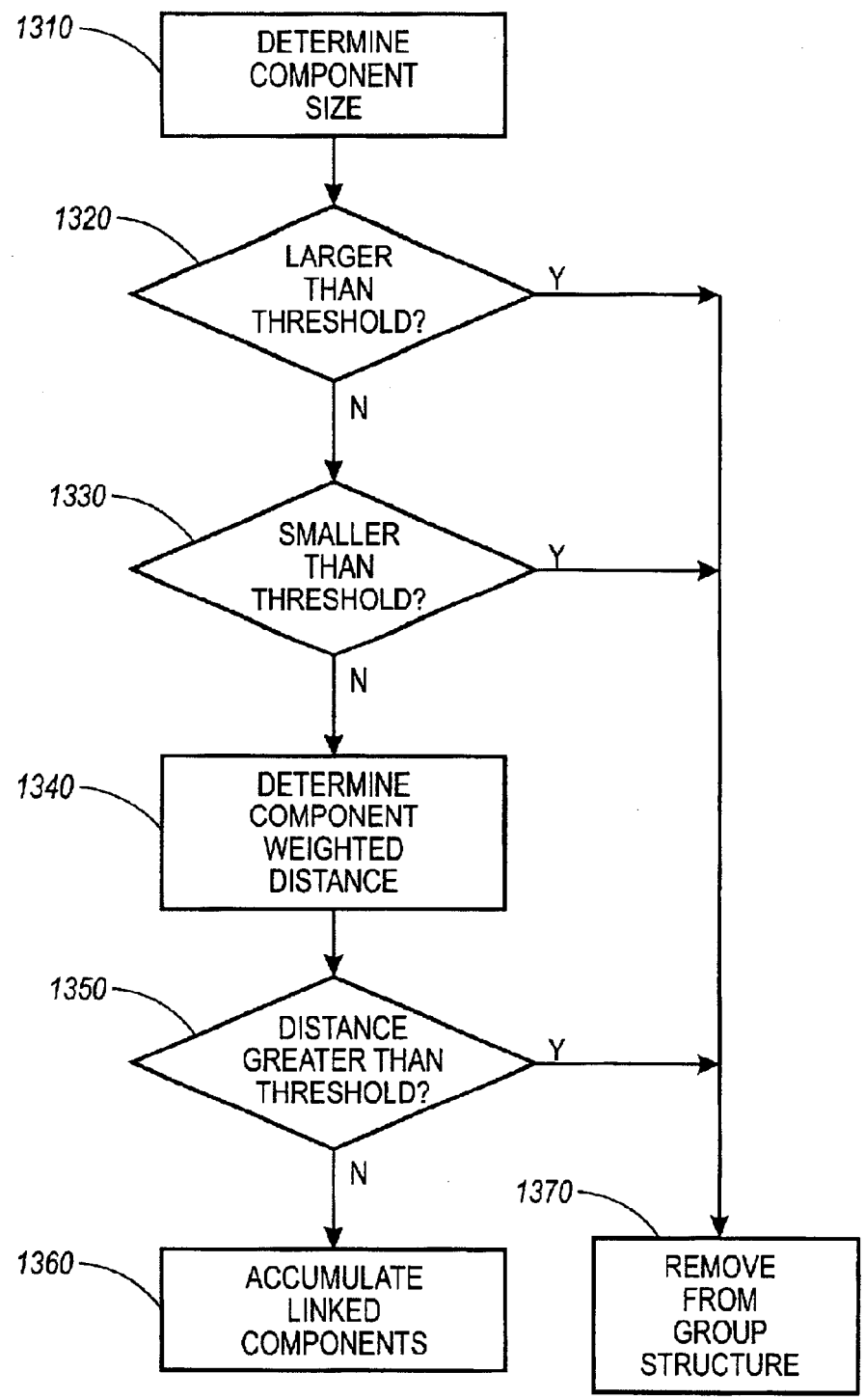
FIG. 13 is a flow chart showing steps for identifying groups of connected components.

In FIG. 13, the processor filters connected components by size to remove objects larger or smaller than specified threshold sizes. In step 1310 the processor determines the size of the available components. Those components that are larger than a threshold are identified at step 1320 and removed from the possible group structure at step 1370. Of the remaining components, those components that are smaller than a second specified threshold are identified at step 1330 and removed from the possible group structure at step 1370. The processor then forms links among connected components whose weighted distance is less than a third threshold value. In determining weighted distance, the processor may consider the near-neighborness of the links, or associations between some objects within the spatial vicinity, through techniques known in the art. In the case in which weighting is based on the relative direction of a link, weighting may be stronger for one direction of link than for another. Weighting may be determined automatically or by spatial analysis of image material in the vicinity. At step 1340 the processor determines the weighted distance of the connected components and at step 1350 identifies those components whose weighted distance exceeds the threshold value. Those components whose weighted value exceeds the threshold value are removed from the possible group structure at step 1370. At step 1360 the processor accumulates groups by following the links among components. An example of this method is illustrated and discussed above with reference to FIG. 9.

Several methods may be used to destroy groups. For example, a user may select a group and abolish it by an explicit menu command. Alternatively, the processor may automatically remove an object from a group when a user drags or moves an object sufficiently far from the other members of the group to which it belongs.

It is noted that within this application reference will be made to "tapping", "clicking on" or otherwise selecting an object. These words are intended to interchangeably refer to the act of selecting the object. The term tapping is generally used in reference to the physical act of touching the stylus of a pen-based computing system to the screen or tablet and shortly thereafter lifting the stylus from the screen (i.e. within a predetermined period of time) without moving the stylus any significant amount (i.e. less than a predetermined amount, as for example two pixels). This is a typical method of selecting objects in a pen-based computing system. The term "clicking on" is intended to be broader in scope and is intended to cover not only tapping, but also the action of selecting an object using a button associated with a mouse or track ball as well as the selection of an object using any other pointer device.

Figure 12:
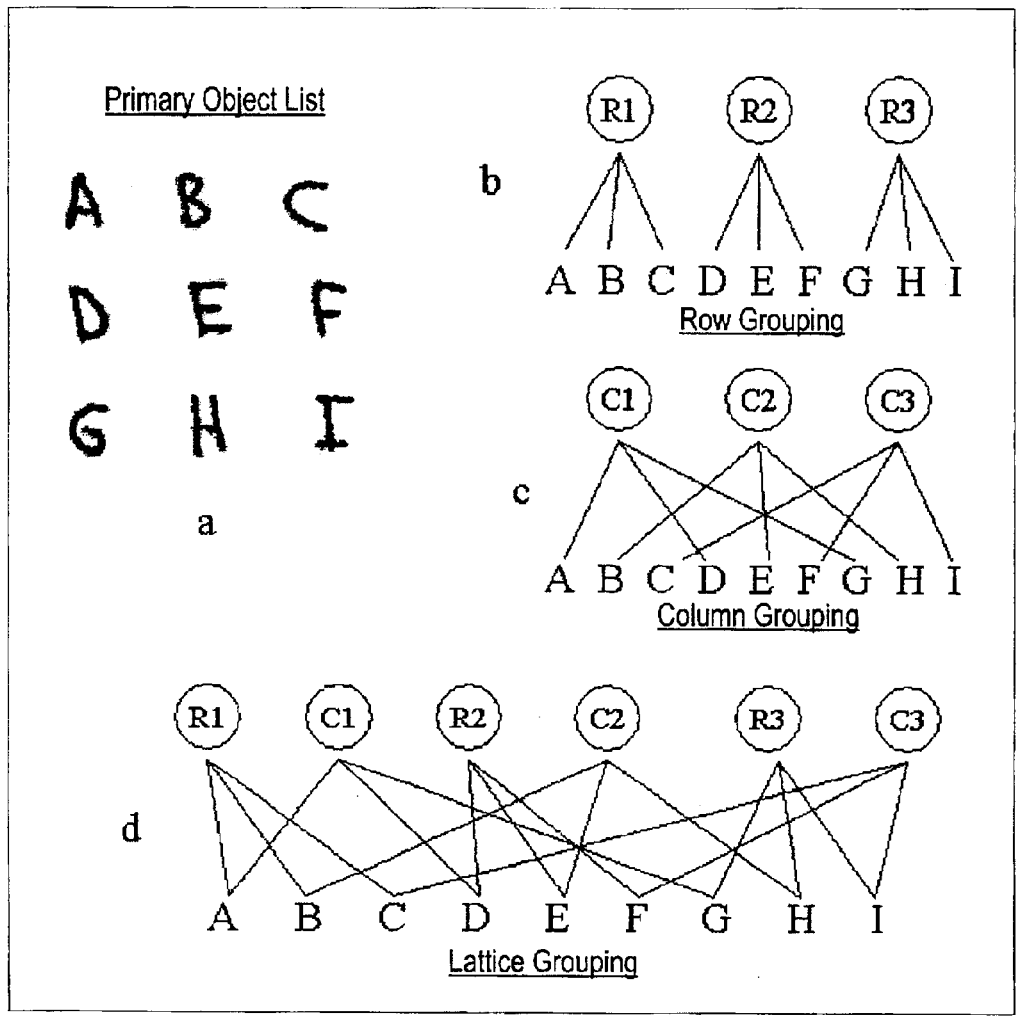
FIGS. 12a–d illustrate possible grouping structures.
Figure 14:
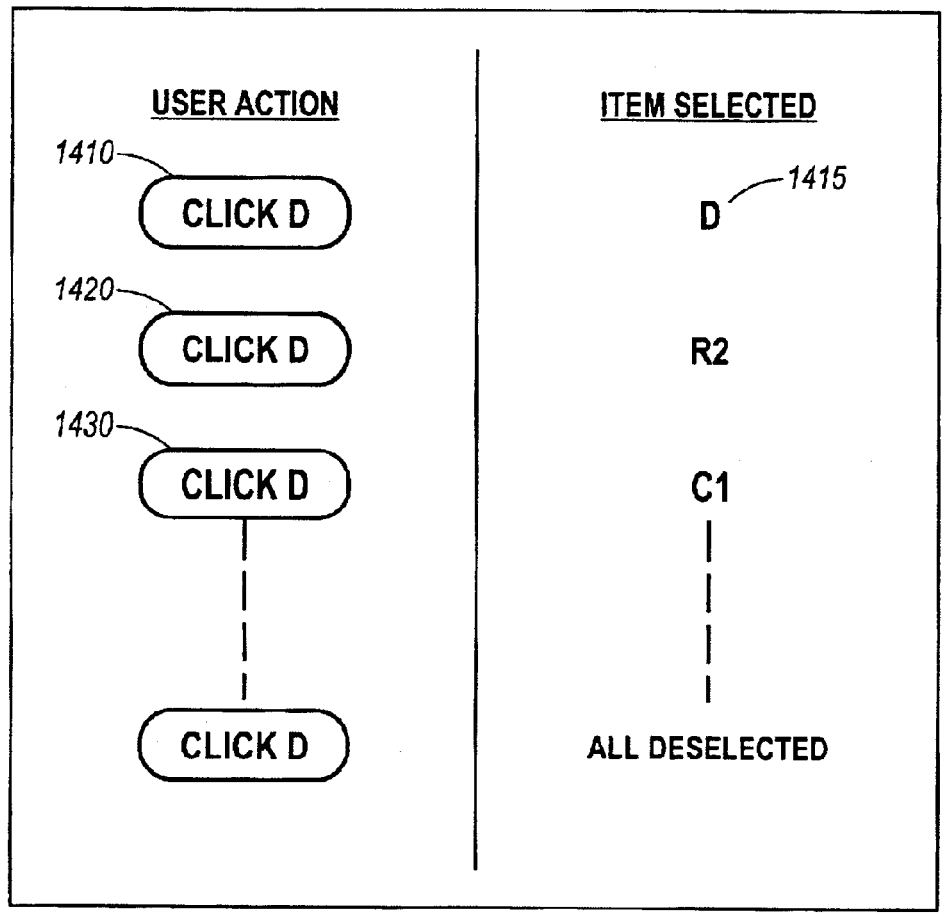
FIG. 14 illustrates the steps for identifying groups to which an object belongs.

Any specific object may belong to numerous groups, with one method shown in FIG. 14 for selecting groupings of image material shown in FIG. 12. For example, when the user clicks or taps an object once, in this case "D" at step 1410, the item selected is "D". If the user clicks or taps "D" again, at step 1420, the next thing selected is the first in the list of groups of which that object is a member, in this example "C1". Subsequent clicks on the object, such as at step 1430, select the remaining groups that the object supports, for example "R2". Finally, after all the groups have been selected in this way, clicking or tapping the object as in step 1440 deselects everything and the process may begin again. In this way repeated clicks or taps allows the user to cycle through and identify the groups supported by the object.

The priority queue of the groups identified according to the method of FIG. 14 may be reordered, and the most recently used group promoted to the front of the list. The priority queue may be ordered by other criteria as well, for example by smallest-to-largest spatial extent, by measures of perceptual salience, or by the context of selection criteria recently exercised by the user. An example of the latter could be a case in which the user appears to be selecting vertical column groupings. In this case the processor could cause any object belonging to a vertical column group to promote this group in its group membership priority queue. Reordering of groups infers the user's intent as to the kind of perceptual object the user is most interested in to present the objects to the user in a hierarchical sequence, with most favored objects first. It sets a priority and ordering on the Composite Object the user sees on repeated clicks.

Figure 15:
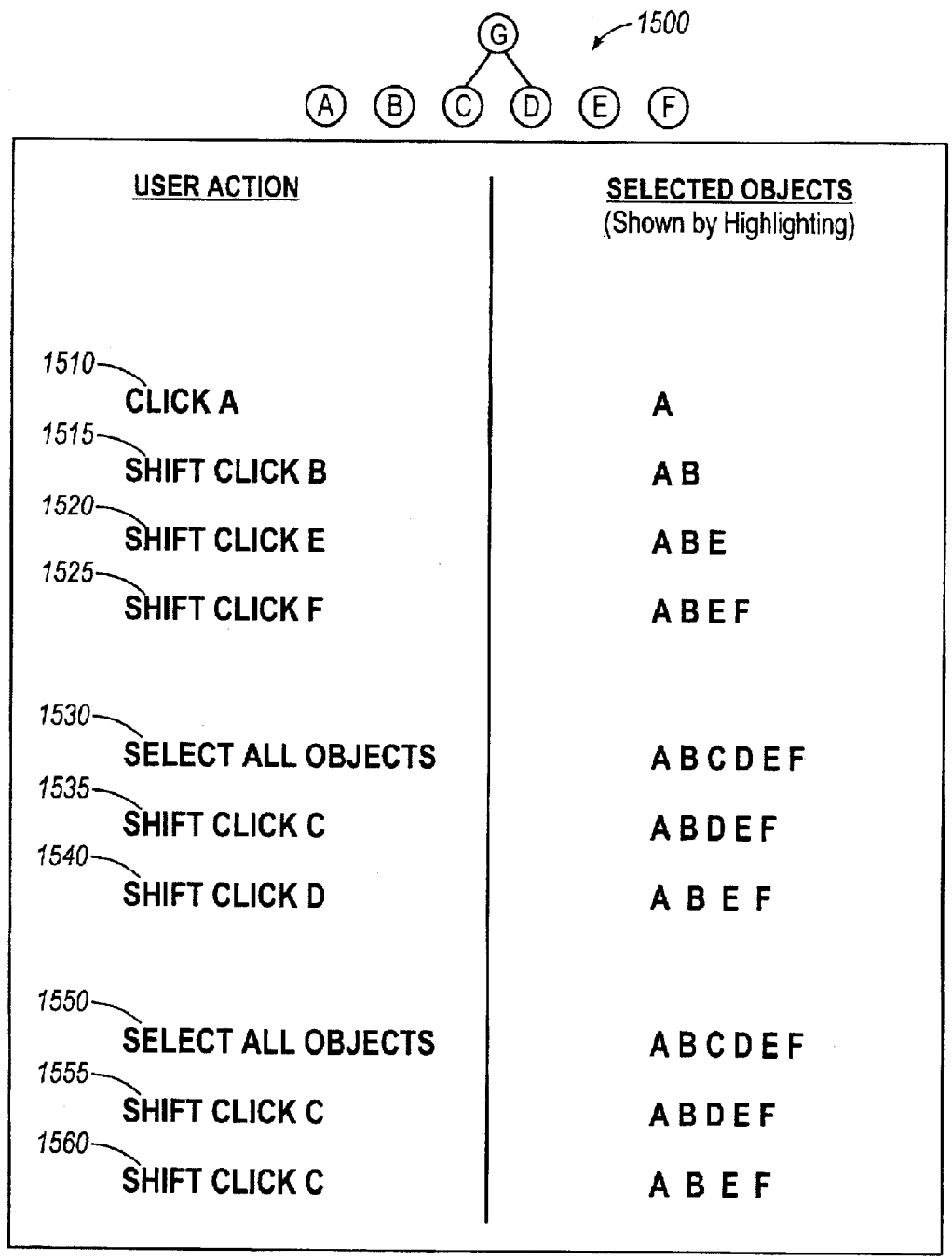
FIG. 15 illustrates using a grouping structure to edit object selections.

Grouping structures may also be used to edit selections, as illustrated in FIG. 15. In this example, the user has created objects "A", "B", "C", "D", "E" and "F" at 1500, and object "C" happens to belong to a group containing objects "C" and "D", but no other groups have been established. If the user wishes to select objects "A", "B", "E" and "F", one approach is to select object "A" by clicking on object "A" at step 1510. Then, by holding down a particular key on the keyboard (for example the shift key) and clicking on another object, this object will be added to the set of selected objects, as is the case with "B" at step 1515, "F" at step 1520 and "F" at step 1525. Alternatively, the user could select all of the objects, perhaps by an encircling gesture, at step 1530 and then remove "C" and "D" individually by shift-clicking "C" at step 1535 and shift-clicking "D" at step 1540. Another alternative is to select all of the objects, perhaps by an encircling gesture, at step 1550, and then removing "C" and "D" as a group by shift-clicking "C" twice, as at steps 1555 and 1560. The first shift-click removes "C" from the selection. Subsequent shift-clicks on "C" de-selects groups to which "C" belongs, leaving objects "A", "B", "E" and "F", as shown in step 1560, as the remaining objects in the group.

This invention utilizes these selection tools to establish hyperlinks between an object and a destination or source. Currently available tools support the formation of hyperlinks between structured image objects, or between simply shaped image regions, but there is no easy, convenient, and effective way to specify a link whose "hot" region is an arbitrarily-shaped but perceptually-salient image object. Using current tools, the user must select among an array of predefined geometric shapes for the region, including circle, rectangle, and polygon. Then the user must specify the parameters of the shape object, preferably through the use of a graphical user interface. This process can become tedious and problematic if a number of different hyperlinks need to be established for nearby and complexly shaped image regions.

The ability to establish unidirectional or bi-directional hyperlinks between objects and destinations or sources is provided by the selection tools described herein, which are based on image processing and analysis technology. Beginning with an undifferentiated image, certain primitive image objects are automatically defined, and certain salient groupings of these are established. Using simple mouse and keyboard operations the user can easily establish additional image objects as Primary Image Objects or Composite Image Objects. The user may then select these objects, and the complex regions they define, simply by clicking a mouse over them.

Figure 16:
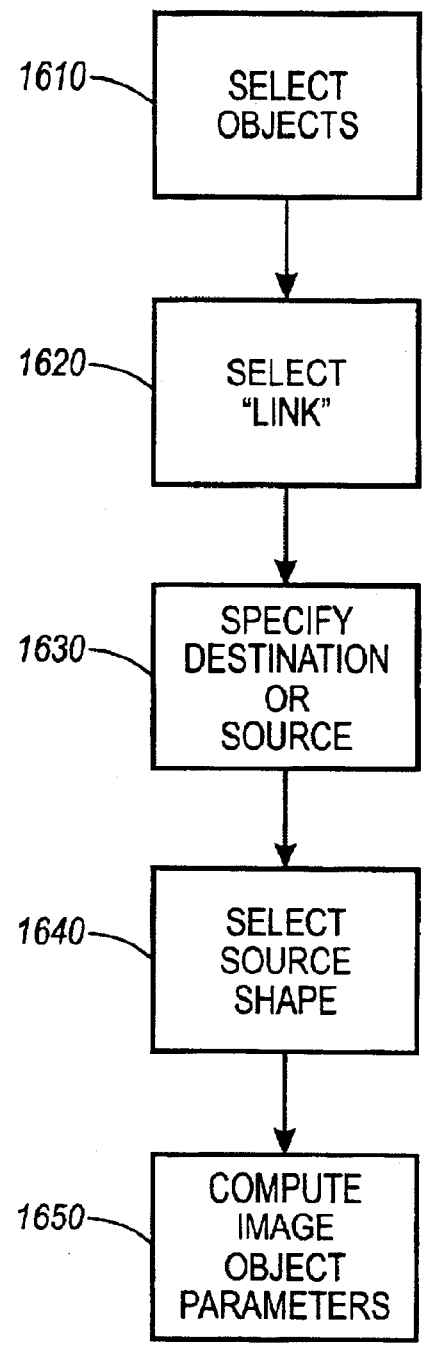
FIG. 16 is a flow chart showing the steps for establishing bi-directional hyperlinks according to this invention.

FIG. 16 illustrates the method for creating bi-directional hyperlinks between objects and destinations or sources. At step 1610, any selected image object(s) may become the source or destination of a hyperlink. The link may be established by clicking the right mouse button, and selecting a "link" item form a pop-up menu, shown at step 1620. The user then specifies where the link is to point at step 1630. This may be accomplished through a text entry box, or some other means known to the art. To instantiate the link, the system selects from among the available link source shapes (e.g. circle, rectangle, polygon) the one best suited to the selected image object(s) at step 1640. The parameters of this object are then automatically computed from the properties of the image region at step 1650. For example, the points of a polygon selection shape are computed by sampling points from the convex hull, exterior bounding contour, or other derived geometrical approximation to the shape of the selected region. Links from image objects defined by multiple discontiguous image patches are supported by establishing multiple source regions all pointing to the same destination.

Under existing hyperlink standards, any given image location may or may not support multiple hyperlinks. For example, in a case of two overlapping hyperlink source polygons, if the user clicks in the intersection region, one or the other link will be followed depending on which region polygon occurs first in a file. In contrast to this, the subject invention provides richer link structure than the conventional hyperlinked document formats. This invention permits the selection of multiple groups sharing the same patch of image. The user may cycle through selected objects pertaining to a given location by repeatedly clicking the mouse button. As an image viewer, this invention permits any selectable image object, including complex composite objects, to have their own independent hyperlinks. These links can be followed by an action other than a left mouse button click, for example a double-click, right button click, or right button click followed by selection of the link following through use of a pop-up menu.

Figure 17:
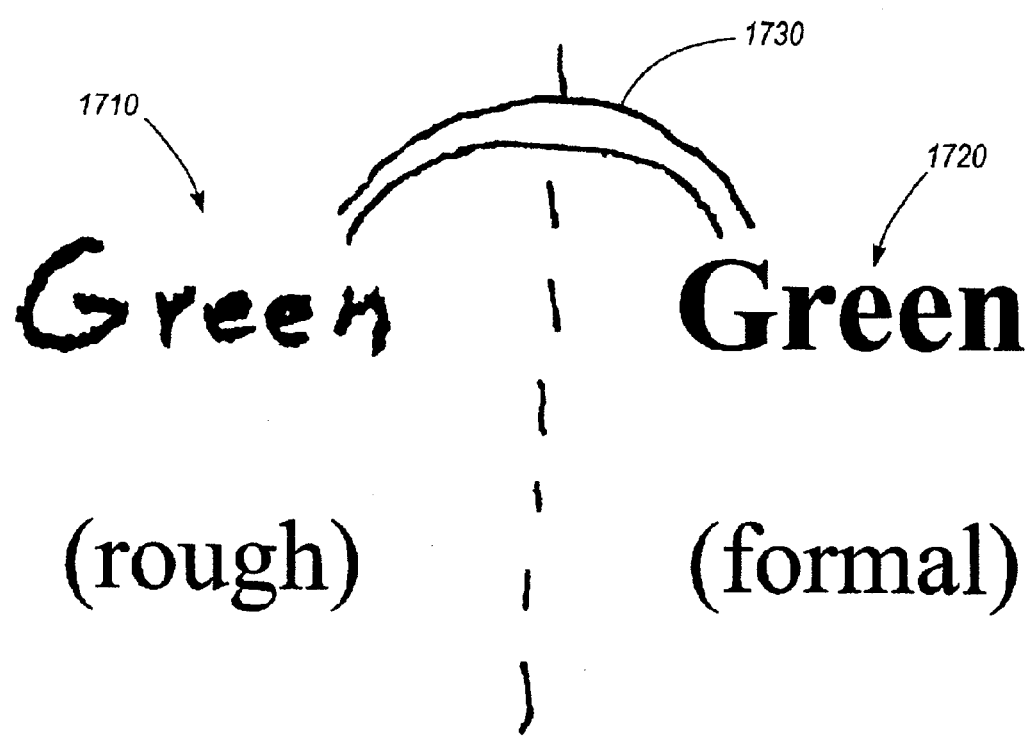
FIG. 17 illustrates the substitution of typed text for handwritten material.

A contribution of the present invention is the provision for managing a lattice structure which represents multiple possible groupings of primitive image objects which may include pen strokes and bitmap objects. For example, the user may easily substitute typed text for handwritten material such as handwritten notes, as illustrated in FIG. 17. In FIG. 17 handwritten material 1710 in rough form is replaced by typewritten material 1720 and is associated with typewritten material 1720 through alternative formality relation 1730. The prior art for verifiers in Optical Character Recognition (OCR) systems exhibits the ability of a system to display scanned image material with certain regions highlighted, then the user types text which replaces the highlighted scanned material with formally generated characters in one of the system's known fonts.

The present invention augments this functionality in two ways. First, it incorporates the selection mechanisms described hereinabove. The system presents the user with not just a single choice of original image material to be replaced with typed text, but instead is able to choose exactly what image material is to be replaced. This is accomplished through use of any or all of the tools disclosed herein: rectangle dragging, freeform path dragging, polygon selection, selection of established primitive image objects with a single mouse click, selection of established groups of image objects with multiple mouse clicks, and editing of group structure by depressing a single prespecified key, such as the shift key, while performing selection operations. These operations make use of the lattice structure of relationships between primitive image objects and Composite Objects representing groupings of them. After image material is selected by any of these means, the user may commence typing text. Once text is entered, the selected image material is removed from the display and replaced with an image of the typed text.

It will be noted that this functionality applies also in systems where some sort of automatic character recognition is provided. In these cases, instead of the user typing text, the user may invoke a character recognition system which would be applied to just the image material selected by the user. In this way the user is able to simplify the job of any character recognition system by reducing the complexity of the image input material it is given to recognize, e.g. by isolating single words which OCR/ICR systems might recognize successfully in isolation but not when surrounded and intruded upon by extraneous image material.

Secondly, the present invention teaches a method for maintaining established group structure even while the user replaces source image material with typed text. The Primary Image Object (e.g. Bitmap Objects), which are to be replaced by typed text, may in many cases participate in groups, which are represented by Composite Objects. These groups should be preserved if possible even if the selected Bitmap Objects are removed and replaced with typed text. This is accomplished according to the method illustrated in the flow chart of FIG. 18. Here, typed text is entered into the display using a special kind of Bitmap Object called a Text String Bitmap Object. This is a Bitmap Object which is associated with a set of ascii characters plus typography information such as font family, font size, font color, etc. The textual characters and typography information permit this Bitmap Object to be modified by the user in terms of its formatted textual appearance.

Figure 18:
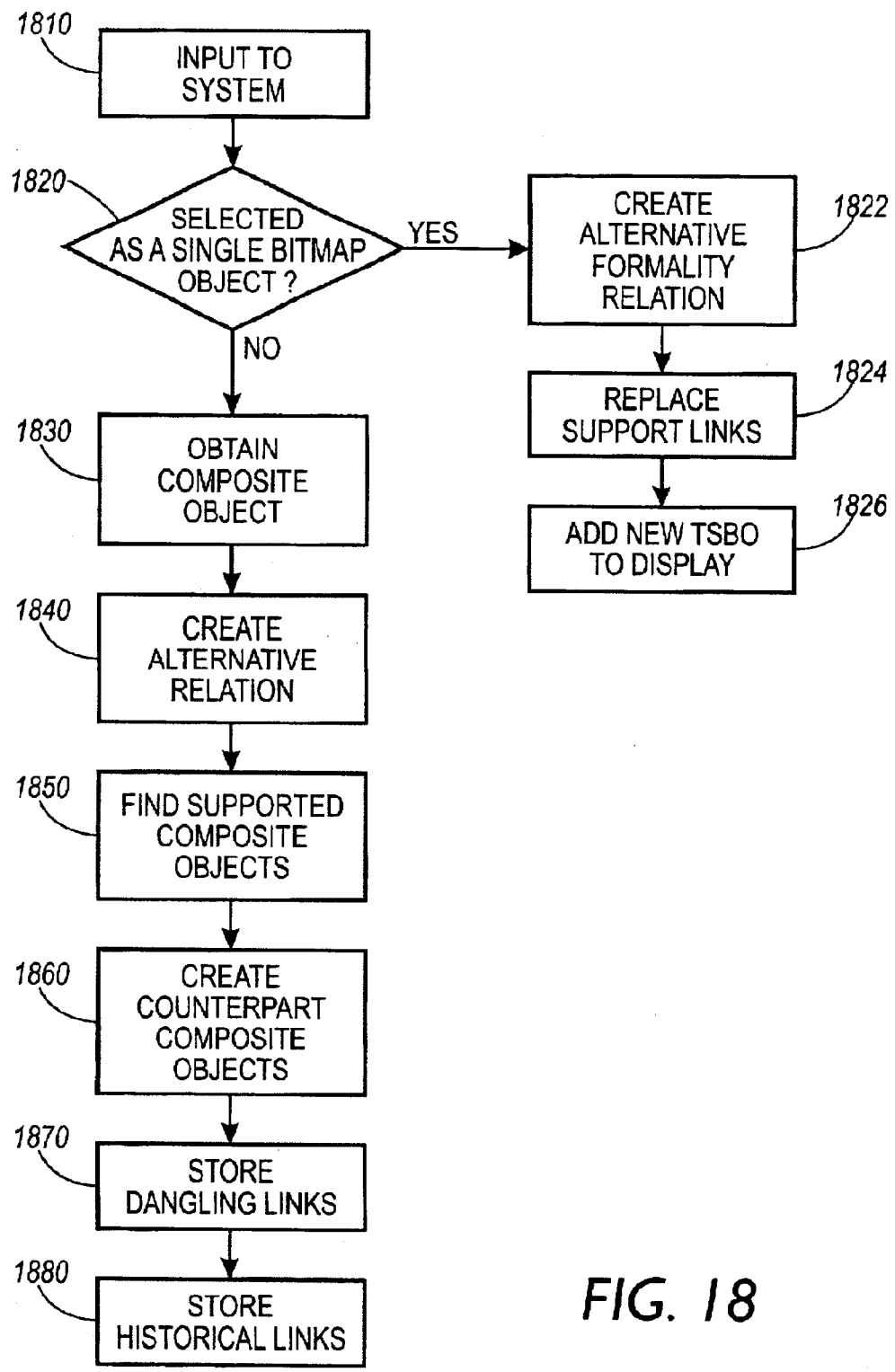
FIG. 18 is a flow chart showing steps for the substitution of typed text for handwritten material.
Figure 19:
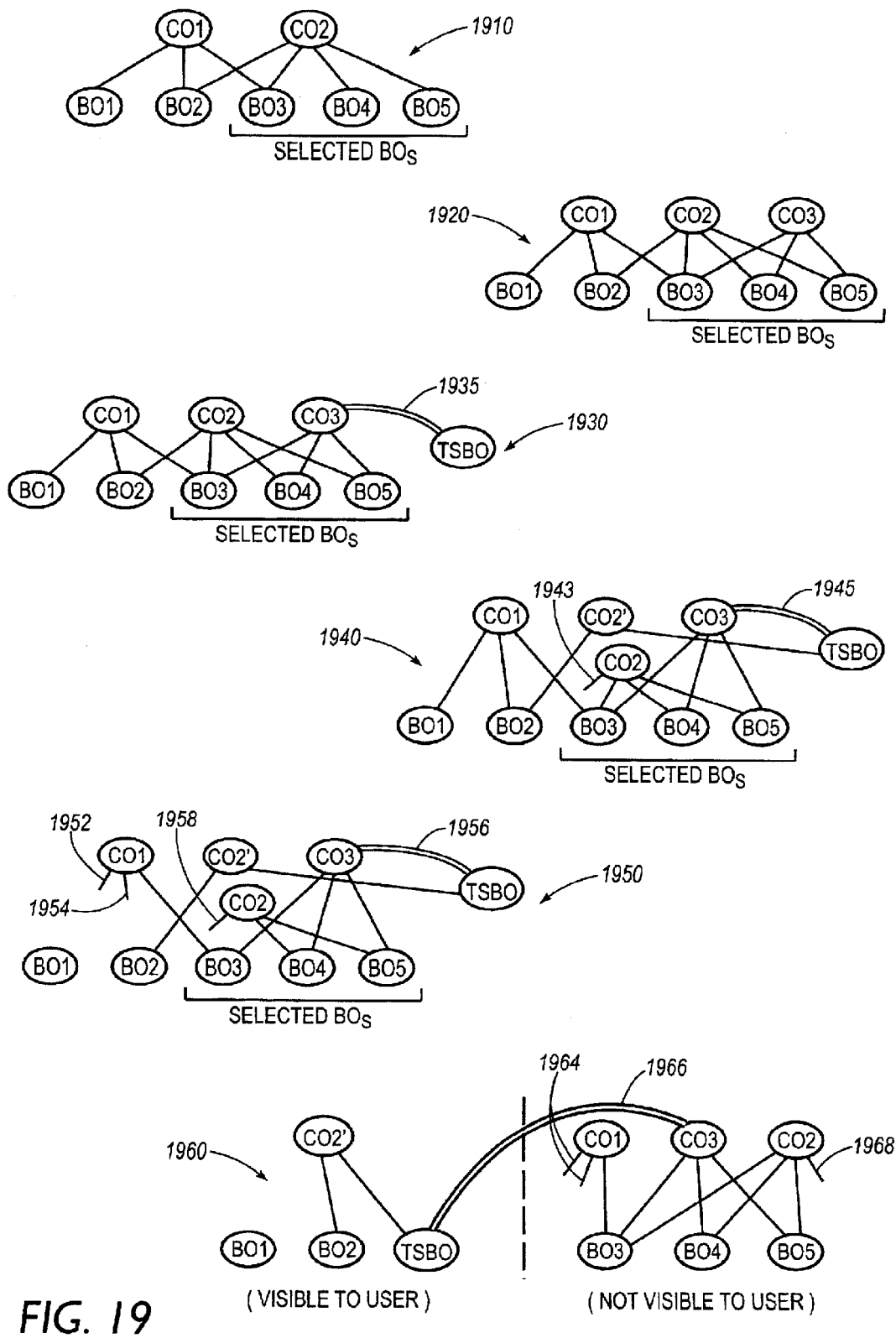
FIG. 19 illustrates adjustments to the grouping structure during the substitution of typed text for handwritten material when selected image objects are comprised of multiple Bitmap Objects.

At step 1810, the input to the system may include Bitmap Objects, with a group structure represented by a lattice of Composite Objects, a Text String Bitmap Object (TSBO), and a listing of Selected Bitmap Objects the TSBO is to replace in the image display. This is illustrated in FIG. 19 with grouping diagram 1910, in which Composite Object CO1 is supported by Bitmap Objects BO1, BO2, and BO3. Composite Object CO2 is supported by Bitmap Objects BO2, BO3, BO4, and BO5. Several of the Bitmap Objects, in this case BO3, BO4, and BO5, are identified as being "selected" for replacement by the TSBO. Referring now to FIG. 18, at step 1820 a determination is made as to whether the selected image objects are comprised of a single Bitmap Object.

If the selected image objects are not comprised of a single Bitmap Object, then at step 1830, a Composite Object corresponding to the collection of selected Bitmap Objects is identified. This is illustrated in FIG. 19 at grouping diagram 1920, in which Composite Object CO3 is the Composite Object for selected Bitmap Objects BO3, BO4 and BO5.

Referring back to FIG. 18, at step 1840 the processor creates an Alternative Formality Relation between the Composite Object and a new TSBO. This is illustrated in FIG. 19 at grouping diagram 1930, in which alternative formality relation 1935 is established between Composite Object CO3 and the TSBO. Referring once again to FIG. 18, at step 1850 the processor identifies those Composite Objects whose supporting Bitmap Objects include the entire set of selected Bitmap Objects, as well as additional Bitmap Objects. The additional Bitmap Objects supporting each such Composite Object are identified as the non-selected supporting Bitmap Objects. As can be seen in FIG. 19 at grouping diagram 1930, the Composite Object whose support includes the entire set of selected Bitmap Objects plus additional Bitmap Objects is CO2. In this case the non-selected supporting Bitmap Object is BO2.

Referring again to FIG. 18, at step 1860 the processor removes the links from the non-selected supporting Bitmap Objects and identifies these as historical links. The processor then creates a counterpart Composite Object whose support is the non-selected supporting Bitmap Objects plus the new TSBO. This is illustrated in FIG. 19 with grouping diagram 1940, in which the counterpart Composite Object is CO2'. Alternative formality relation 1945 exists between the TSBO and the Composite Object CO3. Historical link 1943 replaces the full link between Composite Object CO2 and Bitmap Object BO2.

Referring once more to FIG. 18, at step 1870 the processor identifies Composite Objects whose support does not include the entire set of selected Bitmap Objects and removes the links to the non-selected Bitmap Objects supporting these Composite Objects. These are stored as historical links, to be restored in the event that the replacing typed text in the display is itself replaced by the original informal Bitmap Objects it replaced. This is illustrated in FIG. 19 at grouping diagram 1950, in which Composite Object CO1 is identified as the Composite Object whose support does not include the entire set of selected Bitmap Objects, but does include additional Bitmap Objects, in this case BO1 and BO2. The links to non-selected Bitmap Objects BO1 and BO2 have been removed and replaced by historical links 1952 and 1954. As discussed above the full link between Composite Object CO2 and Bitmap Object BO2 has also been replaced with historical link 1958, and the alternative formality relation 1956 continues to exist between Composite Object CO3 and the TSBO.

Again referring to FIG. 18, at step 1880 the selected Bitmap Objects are removed from the display and the new TSBO is added to the display. FIG. 19 illustrates this at grouping diagram 1960, in which the primary objects to the left side of the dotted line remain visible to the user, but the objects to the right side of the dotted line are no longer visible to the user. As can be seen, selected Bitmap Objects BO3, BO4 and BO5 are no longer visible to the user and have been replaced by the new Text String Bitmap Object (TSBO) supporting a counterpart Composite Object CO2'. Alternative formality relation 1966 continues to exist between the TSBO and Composite Object CO3, thus enabling a reversal of the process if desired by the user. Historical links 1964 are not accessible as they are associated with Composite Object CO1; similarly, historical link 1968 is also no longer accessible on the display.

Figure 20:
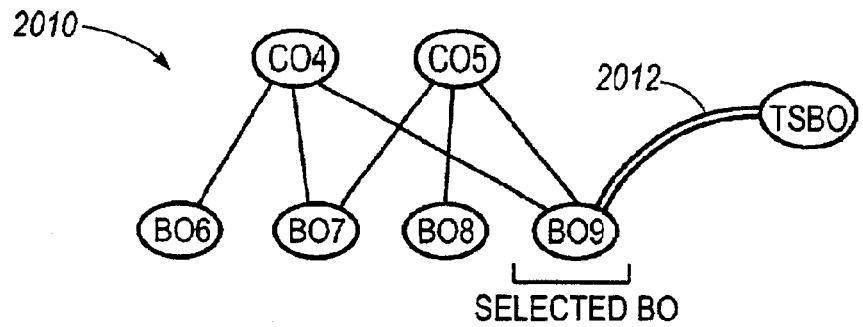
FIG. 20 illustrates adjustments to the grouping structure during the substitution of typed text for handwritten material when selected image objects are comprised of a single Bitmap Object.
Figure 20:
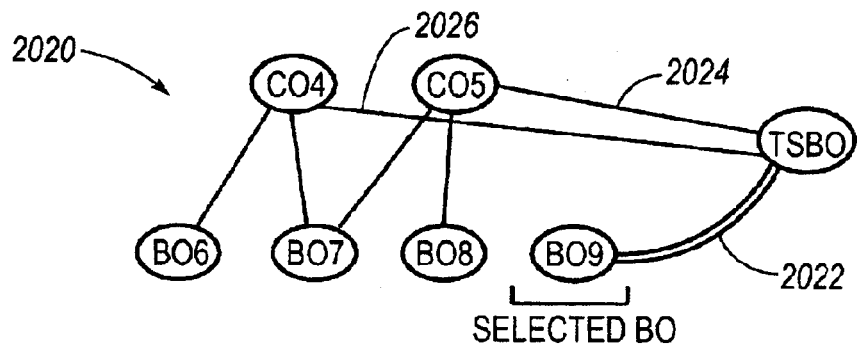
Figure 20:
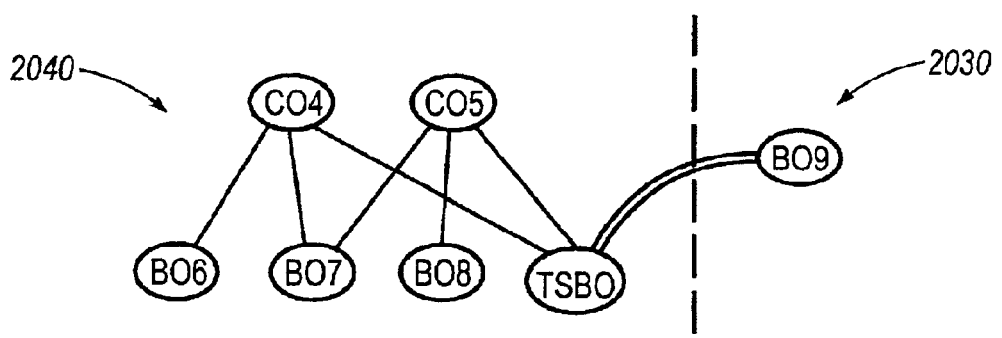

Returning again to FIG. 18, if the selected image objects are comprised of a single Bitmap Object, at step 1822 the processor creates an Alternative Formality Relation between the selected Bitmap Object and a new TSBO. This is illustrated in FIG. 20 in grouping diagram 2010, in which the selected single Bitmap Object BO9 is connected to the TSBO through Alternative Formality Relation 2012. In this example, Bitmap Objects BO6, BO7 and BO9 support Composite Object CO4; Bitmap Objects BO7, BO8 and BO9 support Composite Object CO5.

Referring now to FIG. 18, at step 1824 the processor identifies each Composite Object supported by the selected Bitmap Object and replaces the support link to the Bitmap Object with a support link to the new TSBO. FIG. 20 illustrates this at grouping diagram 2020, in which the support links between Composite Objects CO4 and CO5 to selected Bitmap Object BO9 have been replaced by support links 2026 and 2024 respectively to the TSBO. Alternative Formality Relation 2022 continues to connect the TSBO with selected Bitmap Object BO9.

Referring again to FIG. 18, at step 1826 the processor removes the selected Bitmap Object from the display and replaces it with the new TSBO. FIG. 20 illustrates this in grouping diagram 2030, in which the selected Bitmap Object BO9 is no longer visible to the user in the display, having been replaced by the TSBO.

The result of the procedure described above is a reconfigured structure lattice, whereby the TSBO replaces the selected Bitmap Objects in the list of displayed image objects visible in the display, while groups involving the selected Bitmap Objects now become associated with the TSBO. This structure leaves "historical links", which preserve the information about the original groupings. This permits the TSBO to be exchanged and the original Bitmap Objects it replaced to be restored, with all of their prior grouping structure.

Figure 21:
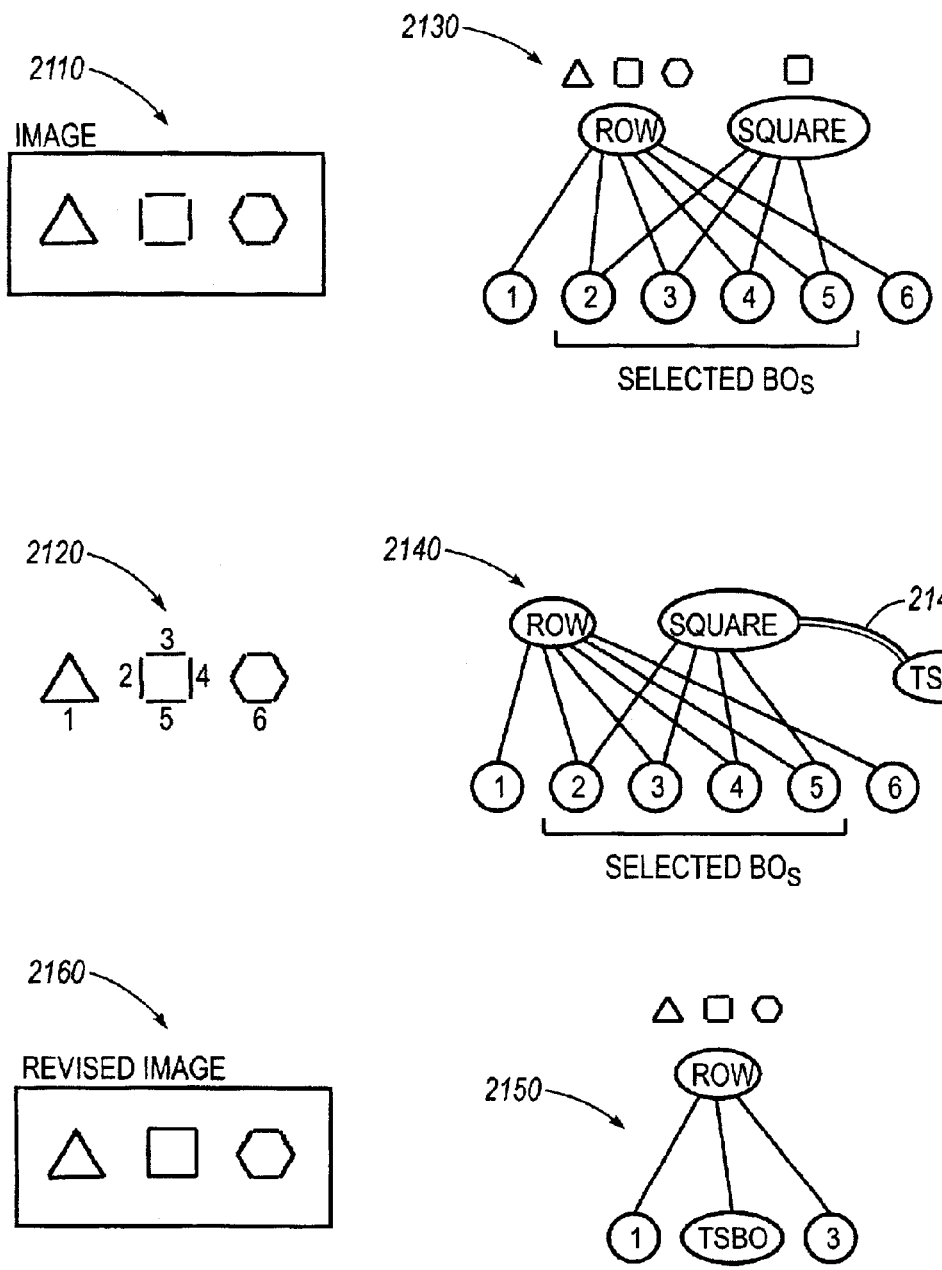
FIG. 21 illustrates changes to the image and the grouping structure when precise graphic objects are substituted for hand-drawn material.

It will be noted that although this aspect of the invention is described with regard to replacing Bitmap Objects representing textual material with typed text represented in a Text String Bitmap Object, this procedure applies as well to purely graphical or line-art data, thus enabling groups of image primitives to be replaced with Formal Graphic Objects while maintaining prior grouping relationships. For example, FIG. 21 illustrates that a hand-drawn square can be replaced by a formal, precise graphical image of a square. In FIG. 21, the image seen on the display includes a triangle, a hand-drawn square, and an octagon. The individual Bitmap Objects include Bitmap Objects 1 (triangle), 3–5 (square) and 6 (hexagon). Grouping diagram 2130 shows the grouping structure associated with this image. While the Composite Object "Row" includes Bitmap Objects 1, 2, 3, 4, 5 and 6, Composite Object "Square" includes Bitmap Objects 2, 3, 4 and 5. In grouping diagram 2140 Alternative Formality Relation 2142 has been established between the TSBO and the Composite Object "Square". At grouping diagram 2150 the selected Bitmap Objects have been removed from the display and have been replaced by the TSBO. On the display, the revised image will appear as at 2160, with the hand-drawn square replaced with a formal geometric object. Using this procedure, the graphical square can participate in the groups the original hand-drawn square did (e.g. the "Row" group). As will be appreciated, this typed text replacement technique may be used in the context of the selection techniques presented hereinabove, including the ability to select by dragging and to select by multiple clicking of the mouse to cycle through groups.

While the present invention has been illustrated and described with reference to specific embodiments, further modification and improvements will occur to those skilled in the art. For example, the editor described herein may be combined with a digital camera that interfaces to a computer to form a graphics/text tool usable by children as well as adults. Although discussed with reference to text and line art, the operations illustrated herein apply equally well to any type of image object. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A graphical input and display system for creating and manipulating an electronic image, comprising:

user input means for manipulating elements of the electronic image;

image input means for entering the electronic image onto a display means;

a processor, connected for receiving requests for image editing operations and for accessing a memory structure;

program memory means comprising:

user interaction module for entering new, unrestricted image material or selecting and modifying existing image material to form primary image objects;

grouping module for creating visible image elements and maintaining an unrestricted, arbitrary grouping structure, and setting a priority and ordering for composite objects, wherein said priority ordering includes at least one member selected from the group consisting of rearrangement based on algorithms that determine smallest-to-largest spatial extent, measures of perceptual salience, and the context of selection criteria recently exercised by the user;

data output module for presenting a view of the graphical image; and data memory means comprising:

data input data structure; and data output data structure.

2. The graphical input and display system according to claim 1, further comprising a data preparation module.

3. The graphical input and display system according to claim 2, wherein said data preparation module determines whether an electronic image is to be treated as a photographic image.

4. The graphical input and display system according to claim 2, wherein said data preparation module determines whether to treat all objects in the electronic image as text and line art.

5. The graphical input and display system according to claim 2, wherein said data preparation module automatically distinguishes foreground pixels from background pixels and as a result sets background pixels to transparent.

6. The graphical input and display system according to claim 2, wherein said data preparation module determines whether to apply pre-segmentation to the electronic image.

7. The graphical input and display system according to claim 1, further comprising a hyperlink module for creating hyperlinks between regions on documents.

8. The graphical input and display system according to claim 1, further comprising a parsed image data structure.

9. The graphical input and display system according to claim 8, wherein said parsed image data structure comprises image region classes of text and line art, continuous/photographic, and halftone regions.

10. The graphical input and display system according to claim 1, further comprising a segmentation module for automatically decomposing image material into primary image objects, including a plurality of elemental bitmap objects and curvilinear bitmap objects.

11. The graphical input and display system according to claim 1, wherein said grouping module reconstitutes the grouping structure when grouping structure is destroyed through operation on not less than one bitmap object.

12. The graphical input and display system according to claim 1, wherein said grouping module permits the creation of new groups.

13. The graphical input and display system according to claim 1, wherein said grouping module invokes automatic recognition routines to identify perceptually meaningful groups to be represented by not less than one composite object.

14. The graphical input and display system according to claim 1, wherein said grouping module infers a user's intent as to the kind of perceptual object of most interest to said user.

15. The graphical input and display system according to claim 1, wherein said user interaction module exchanges typed text for selected image objects.

16. The graphical input and display system according to claim 15, wherein exchanging typed text for selected image objects comprises maintaining the grouping relationships present between bitmap objects and other objects in the graphical image.

17. A method for organizing a source electronic image entered on a display device into image objects comprising:
   selecting arbitrary existing image material;
   establishing primary image objects;
   modifying the image material; and
   reconstituting an unrestricted grouping structure, including setting a priority and ordering for composite objects, wherein said priority ordering includes at least one member selected from the group consisting of rearrangement based on algorithms that determine smallest-to-largest spatial extent, measures of perceptual salience, and the context of selection criteria recently exercised by the user, wherein reconstituting said unrestricted grouping structure comprises: identifying composite objects supported by a plurality of primary image objects; moving not less than one primary image object; determining whether the new location of the moved primary image objects destroys group structure; forming a new composite object with those primary image objects not moved; creating a new composite object for primary image objects that were moved; and creating a new grouping structure.

18. The method for organizing a source electronic image entered on a display device into image objects according to claim 17, further comprising distinguishing foreground pixels of text and line art from background pixels.

19. The method for organizing a source electronic image entered on a display device into image objects according to claim 17, further comprising creating not less than one primary image object representing the preprocessed source image, in which background pixels are set as transparent.

20. The method for organizing a source electronic image entered on a display device into image objects according to claim 17, further comprising creating hyperlinks between regions containing image material.

21. The method for organizing a source electronic image entered on a display device into image objects according to claim 17, wherein said selecting existing image material comprises inputting a closed path enclosing the desired image material.

22. The method for organizing a source electronic image entered on a display device into image objects according to claim 17, wherein said selecting existing image material comprises splitting at least one primary object to form fragmented primary image objects.

23. The method for organizing a source electronic image entered on a display device into image objects according to claim 17, wherein creating a new composite object comprises:
   gathering fragmented primary objects and remaining unfragmented primary objects enclosed by said closed selection path to form enclosed primary objects;
   creating a provisional composite object representing the group of enclosed primary objects;
   removing affected primary objects from a primary object list;
   adding fragmented primary objects to said primary object list; and
   creating support links to enclosed primary objects.

24. The method for organizing a source electronic image entered on a display device into image objects according to claim 17, wherein establishing a new primary image object by merging not less than two primary image objects comprises:
   selecting at least one primary image object;
   determining the bounding box of the union of the selected primary image objects;
   creating a new blank bitmap corresponding to the size of said bounding box;
   copying foreground material from all selected primary image objects into said new bitmap;
   creating a new primary image object of said new bitmap;
   removing selected primary image objects from a primary object list; and
   adding new primary object to said primary object list.

25. The method for organizing a source electronic image entered on a display device into image objects according to claim 17, wherein creating new composite objects comprises:
   locating composite objects supported by all selected primary objects to form filly supported composite objects;
   replacing support links from said selected primary objects with support links to a new primary object for each said filly supported composite object;

locating composite objects supported by a subset of selected primary objects to form partially supported composite objects; and removing all support links to primary objects for each partially supported composite object.

26. The method for organizing a source electronic image entered on a display device into image objects according to claim 17, further comprising:

segmenting image regions into text and line art, continuous tone/photographic, and halftone subregions;

creating separate bitmap objects for said continuous tone and said halftone regions;

deleting said separate bitmap objects from the source image;

breaking the processed source image into a plurality of elemental bitmap objects to form primary objects; and identifying collections of bitmap objects into composite objects, or groups, within a lattice grouping structure.

27. The method for organizing a source electronic image entered on a display device into image objects according to claim 17, further comprising invoking automatic recognition routines to identify perceptually meaningful groups that should be represented by composite objects.

28. The method for organizing a source electronic image entered on a display device into image objects according to claim 17, further comprising automatically determining whether a graphical image is to be treated as a photographic image.

29. The method for organizing a source electronic image entered on a display device into image objects according to claim 17, further comprising determining whether to treat all elements of the graphical image as text and line art.

30. The method for organizing a source electronic image entered on a display device into image objects according to claim 17, further comprising distinguishing foreground pixels from background pixels and setting background pixels to transparent.

31. The method for organizing a source electronic image entered on a display device into image objects according to claim 17, further comprising determining whether to apply pre-segmentation to the graphical image.

32. The method for organizing a source electronic image entered on a display device into image objects according to claim 17, further comprising exchanging typed text for selected image objects.

33. The method for organizing a source electronic image entered on a display device into image objects according to claim 32, wherein exchanging typed text for selected image objects comprises maintaining grouping relationships present between the bitmap objects and other objects in the image.

34. The method for organizing a source electronic image entered on a display device into image objects according to claim 33, further comprising establishing not less than one alterative formality relation between not less than one composite objects and not less than one text string bitmap object.

35. An article of manufacture comprising a computer usable medium having computer readable program code embodied in said medium which, when said program code is executed by said computer causes said computer to perform method steps for editing and manipulating an electronic image entered onto a display, said method steps comprising:

decomposing the electronic image into primary image objects;

organizing said primary image objects into unrestricted, arbitrary groups of primary image objects, such that each said primary image object belongs to one or more groups and each group contains not less than one primary image object;

creating new primary image objects; and reorganizing all or part of said groups of primary image objects into one or more new groups of primary image objects in response to user manipulation of not less than one primary image object, including setting a priority and ordering for said new groups of primary image objects, wherein said priority ordering includes at least one member selected from the group consisting of rearrangement based on algorithms that determine smallest-to-largest spatial extent, measures of perceptual salience, and the context of selection criteria recently exercised by the user.

36. A memory for storing data for access by a program being executed on a computer for creating and manipulating data representing an electronic image, said memory comprising:

a lattice data structure stored in said memory for providing an unrestricted, arbitrary grouping structure defining the relationships between primary image objects and composite objects, including:

a plurality of primary objects stored in said memory, said primary objects being bitmap objects or curvilinear objects, said primary objects arranged in at least one primary object list;

a plurality of composite objects, each composite object including at least one primary object, said composite objects arranged in at least one composite object list, wherein said composite objects are given a priority and ordering, wherein said priority ordering includes at least one member selected from the group consisting of rearrangement based on algorithms that determine smallest-to-largest spatial extent, measures of perceptual salience, and the context of selection criteria recently exercised by the user; and a plurality of hyperlinks linking said primary objects with either or both destination and source objects.

37. A memory for storing data for access by a program being executed on a computer for creating and manipulating data representing an electronic image according to claim 36, wherein said curvilinear objects are derived from at least one of either the electronic image data or input provided by a user.

* * * * *